US010025525B2

(12) United States Patent
Masuda et al.

(10) Patent No.: US 10,025,525 B2
(45) Date of Patent: Jul. 17, 2018

(54) STORAGE SYSTEM, STORAGE CONTROL METHOD, AND COMPUTER SYSTEM

(71) Applicant: HITACHI, LTD., Tokyo (JP)

(72) Inventors: Naoyuki Masuda, Tokyo (JP); Hiroshi Nasu, Tokyo (JP); Tomohiro Kawaguchi, Tokyo (JP); Takahiro Kito, Tokyo (JP); Koji Nagata, Tokyo (JP); Ran Ogata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 15/121,816

(22) PCT Filed: Mar. 13, 2014

(86) PCT No.: PCT/JP2014/056671
§ 371 (c)(1),
(2) Date: Aug. 26, 2016

(87) PCT Pub. No.: WO2015/136665
PCT Pub. Date: Sep. 17, 2015

(65) Prior Publication Data
US 2017/0010839 A1  Jan. 12, 2017

(51) Int. Cl.
*G06F 3/06* (2006.01)
*G06F 13/16* (2006.01)
*G06F 12/109* (2016.01)

(52) U.S. Cl.
CPC .............. *G06F 3/0647* (2013.01); *G06F 3/06* (2013.01); *G06F 3/064* (2013.01); *G06F 3/067* (2013.01);
(Continued)

(58) Field of Classification Search
CPC . H04L 67/1097; G06F 3/0635; G06F 3/0664; G06F 3/0617; G06F 3/067; G06F 3/0649
(Continued)

(56) References Cited

U.S. PATENT DOCUMENTS 8,112,362 B2 * 2/2012 Abei ................. G06F 21/105
705/59
2006/0085607 A1  4/2006  Haruma
2007/0067593 A1  3/2007  Satoyama et al.
2009/0157846 A1  6/2009  Shimozono et al.
(Continued)

FOREIGN PATENT DOCUMENTS

JP  2006-113895 A  4/2006
JP  2007-115221 A  5/2007
(Continued)

OTHER PUBLICATIONS

Japanese Office Action for Japanese Patent Application No. JP2016-507202 dated May 9, 2017.

*Primary Examiner* — Pierre Miche Bataille
(74) *Attorney, Agent, or Firm* — Volpe and Koenig, P.C.

(57) ABSTRACT

The access from a host computer to a storage system is continued before and after data migration in the storage system. A first controller allocates a first logical storage area to a specific virtual storage area, stores first association information indicating the specific virtual storage area and the first logical storage area, and sends the first association information to the host computer. The first controller and the second controller perform data migration from the first logical storage area to a second logical storage area. The first controller releases the first logical storage area from the specific virtual storage area and reflects the release in the first association information. The second controller allocates the second logical storage area to the specific virtual storage area, stores second association information indicating the specific virtual storage area and the second logical storage area, and sends the second association information to the host computer.

12 Claims, 19 Drawing Sheets

(52) U.S. Cl.
CPC .......... *G06F 3/0617* (2013.01); *G06F 3/0619* (2013.01); *G06F 3/0635* (2013.01); *G06F 3/0653* (2013.01); *G06F 3/0664* (2013.01); *G06F 12/109* (2013.01); *G06F 13/16* (2013.01); *G06F 2212/1008* (2013.01); *G06F 2212/657* (2013.01)

(58) Field of Classification Search
USPC .......................................... 711/162, 170, 165
See application file for complete search history.

(56) References Cited

U.S. PATENT DOCUMENTS

| | | | |
|---|---|---|---|
| 2009/0204786 A1* | 8/2009 | Igarashi | G06F 3/0607 711/209 |
| 2011/0066801 A1* | 3/2011 | Sato | G06F 3/0605 711/114 |
| 2011/0138119 A1* | 6/2011 | Yamagami | G06F 3/0605 711/112 |
| 2011/0179414 A1* | 7/2011 | Goggin | G06F 3/061 718/1 |
| 2012/0278569 A1* | 11/2012 | Kawakami | G06F 3/0608 711/162 |
| 2013/0238852 A1 | 9/2013 | Kawaguchi | |
| 2014/0289459 A1* | 9/2014 | Yamamoto | G06F 3/0608 711/103 |

FOREIGN PATENT DOCUMENTS

| | | |
|---|---|---|
| JP | 2009-146106 A | 7/2009 |
| JP | 2013186883 A | 9/2013 |

* cited by examiner

Fig. 9

State A

Host-side conversion information
117

| V-DKC | V-LDEV# | R-DKC | R-LDEV# |
|---|---|---|---|
| 63500 | 0x1000 | 65000 | 0x2000 |
| 63500 | 0x1001 | 65000 | 0x2001 |
| 63500 | None | 66000 | 0x5000 |
| 63500 | None | 66000 | 0x5001 |

711, 712, 713, 714

DKC-side conversion information (X)
117

| V-DKC | V-LDEV# | R-DKC | R-LDEV# |
|---|---|---|---|
| 63500 | 0x1000 | 65000 | 0x2000 |
| 63500 | 0x1001 | 65000 | 0x2001 |

711, 712, 713, 714

DKC-side conversion information (Y)
117

| V-DKC | V-LDEV# | R-DKC | R-LDEV# |
|---|---|---|---|
| 63500 | None | 66000 | 0x5000 |
| 63500 | None | 66000 | 0x5001 |

State B

Host-side conversion information
117

| V-DKC | V-LDEV# | R-DKC | R-LDEV# |
|---|---|---|---|
| 63500 | 0x1000 | 65000 | 0x2000 |
| 63500 | 0x1001 | 65000 | 0x2001 |
| 63500 | None | 66000 | 0x5000 |
| 63500 | None | 66000 | 0x5001 |

Columns: 711, 712, 713, 714

DKC-side conversion information (X)
117

| V-DKC | V-LDEV# | R-DKC | R-LDEV# |
|---|---|---|---|
| 63500 | None | 65000 | 0x2000 |
| 63500 | None | 65000 | 0x2001 |

Columns: 711, 712, 713, 714

DKC-side conversion information (Y)
117

| V-DKC | V-LDEV# | R-DKC | R-LDEV# |
|---|---|---|---|
| 63500 | 0x1000 | 66000 | 0x5000 |
| 63500 | 0x1001 | 66000 | 0x5001 |

Columns: 711, 712, 713, 714

Fig. 12

State C

Host-side conversion information
117

| V-DKC | V-LDEV# | R-DKC | R-LDEV# |
|---|---|---|---|
| 63500 | None | 65000 | 0x2000 |
| 63500 | None | 65000 | 0x2001 |
| 63500 | 0x1000 | 66000 | 0x5000 |
| 63500 | 0x1001 | 66000 | 0x5001 |

Columns: 711, 712, 713, 714

DKC-side conversion information (X)
117

| V-DKC | V-LDEV# | R-DKC | R-LDEV# |
|---|---|---|---|
| 63500 | None | 65000 | 0x2000 |
| 63500 | None | 65000 | 0x2001 |

Columns: 711, 712, 713, 714

DKC-side conversion information (Y)
117

| V-DKC | V-LDEV# | R-DKC | R-LDEV# |
|---|---|---|---|
| 63500 | 0x1000 | 66000 | 0x5000 |
| 63500 | 0x1001 | 66000 | 0x5001 |

Columns: 711, 712, 713, 714

Fig. 15

State A

Argument list
810

811  812  814

| | V-DKC | V-LDEV# | R-LDEV# |
|---|---|---|---|
| PVOL | 63500 | 0x1000 | 0x2000 |
| SVOL | 63500 | 0x1001 | 0x2001 |

State B

Argument list
810

811  812  814

| | V-DKC | V-LDEV# | R-LDEV# |
|---|---|---|---|
| PVOL | 63500 | 0x1000 | 0x2000 |
| SVOL | 63500 | 0x1001 | 0x2001 |

State

Argument list
810

811  812  814

| | V-DKC | V-LDEV# | R-LDEV# |
|---|---|---|---|
| PVOL | 63500 | 0x1000 | 0x5000 |
| SVOL | 63500 | 0x1001 | 0x5001 |

STORAGE SYSTEM, STORAGE CONTROL METHOD, AND COMPUTER SYSTEM

TECHNICAL FIELD

The present invention relates to a storage system including a plurality of storage devices.

BACKGROUND ART

A technique of providing a host computer with a virtual storage device using a plurality of storage devices has been known. PTL 1 discloses a technique in which each of the plurality of storage devices stores information indicating association between a logical volume and a virtual volume, and when the storage device receives a command designating the virtual volume from the host computer, the storage device recognizes the logical volume associated with the virtual volume and executes the command.

CITATION LIST

Patent Literature

[PTL 1]
U.S. Patent Application Publication No. 2013/0238852 (Specification)

SUMMARY OF INVENTION

Technical Problem

When data migration from a storage device having a logical volume allocated to a virtual volume to a logical volume in another storage device is performed, an operation of changing information stored in a host computer and the like are required in order for the host computer to recognize the storage device after the data migration. Moreover, an application(s) executed by the host computer may be closed for the operation.

Solution to Problem

In order to achieve the aforementioned object, a storage system according to a first aspect of the present invention includes: a first storage device; a first controller coupled to a host computer and the first storage device; a second storage device; and a second controller coupled to the host computer, the second storage device, and the first controller. The first controller controls a first logical storage area based on the first storage device, allocates the first logical storage area to a specific virtual storage area that is a virtual storage area, stores first association information indicating the specific virtual storage area and the first logical storage area, and sends the first association information to the host computer. The second controller controls a second logical storage area based on the second storage device. The first controller and the second controller perform data migration from the first logical storage area to the second logical storage area. The first controller releases the first logical storage area from the specific virtual storage area and reflects the release in the first association information. The second controller allocates the second logical storage area to the specific virtual storage area, stores second association information indicating the specific virtual storage area and the second logical storage area, and sends the second association information to the host computer.

Advantageous Effects of Invention

According to the first aspect of the present invention, the access from a host computer to a storage system can be continued before and after data migration in the storage system.

BRIEF DESCRIPTION OF DRAWINGS

FIG. 9 depicts host-side conversion information 117 and DKC-side conversion information 517 in the state A of a virtualization configuration.
FIG. 11 depicts host-side conversion information 117 and DKC-side conversion information 517 in the state B of a virtualization configuration.
FIG. 12 depicts host-side conversion information 117 and DKC-side conversion information 517 in the state C of a virtualization configuration.
FIG. 15 depicts an argument list of a pair management command in each state.

DESCRIPTION OF EMBODIMENTS

The embodiments of the present invention are described below using drawings.

Embodiment 1

Figure 1:
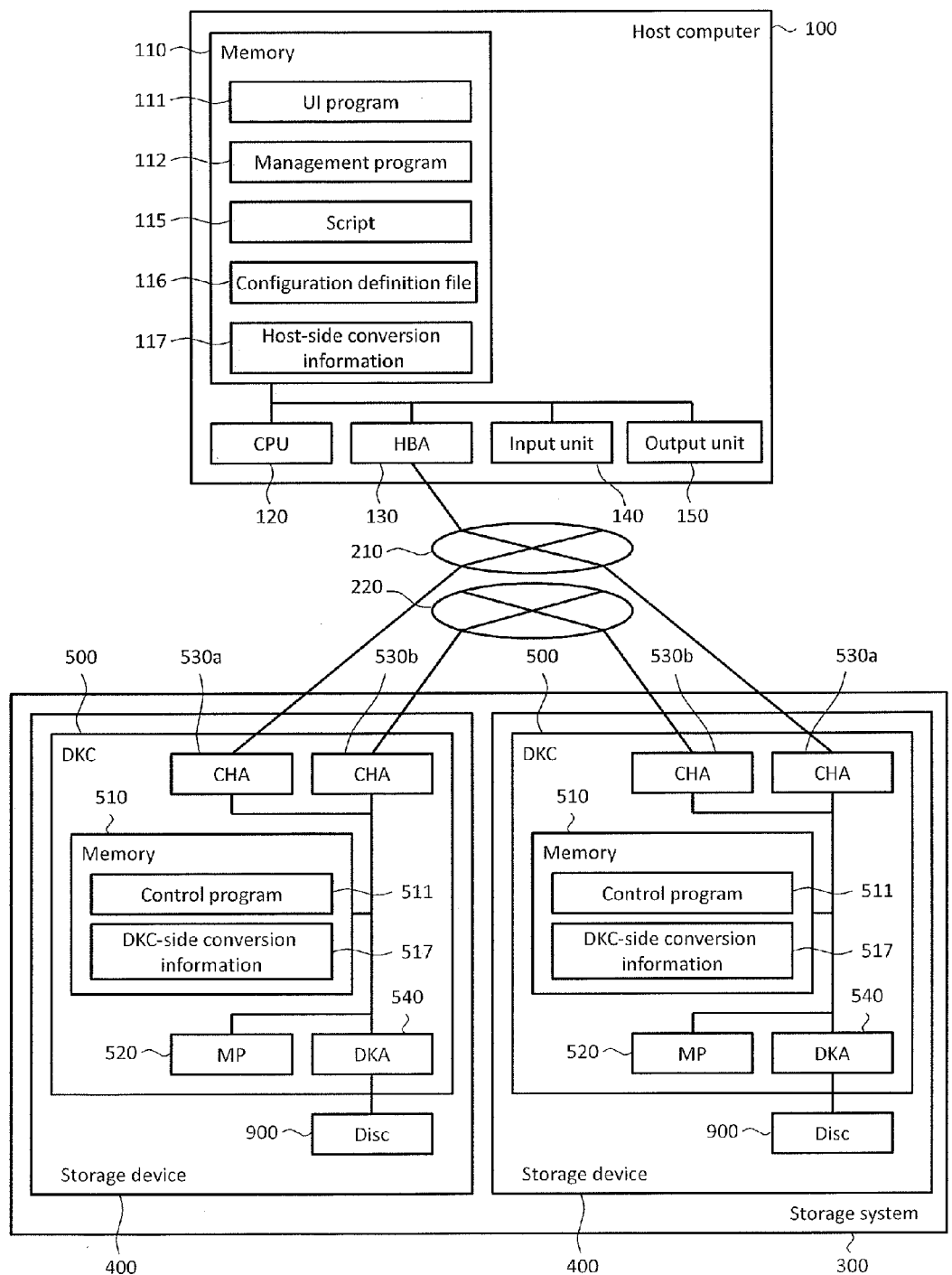
FIG. 1 depicts a configuration of a computer system in the embodiments of the present invention.

In the present embodiment, a computer system including: a storage system including a plurality of storage devices; and a host computer utilizing the storage system is described. The storage system provides the host computer with a virtual storage device.
FIG. 1 depicts a configuration of a computer system in the embodiments of the present invention.

The computer system of the present embodiment includes a host computer 100 and a storage system 300. The host computer 100 is connected to the storage system 300 via a communication network such as SAN (Storage Area Network) 210.

The host computer 100 executes an application and the like for user's operations using the storage system 300. The host computer 100 includes: a memory 110, a CPU (Central Processing Unit) 120, a HBA (Host Bus Adapter) 130, an input unit 140, and an output unit 150. The memory 110 stores a program(s) and data for a process of the host computer 100. The CPU 120 executes the process according to the program(s) stored in the memory 110. The HBA 130 is connected to the storage system 300 via the SAN 210 and communicates with the storage system 300 according to an instruction from the CPU 120. The input unit 140 is, for example, a keyboard, a pointing device, or the like and passes, in response to an input from a user, the input to the CPU 120. The output unit 150 is, for example, a display and displays information from the CPU 120. The input unit 140 and the output unit 150 may be computers different from the host computer 100 and may be connected to the host computer 100 via a communication network such as LAN (Local Area Network).

The memory 110 further stores, as the programs, a UI (User Interface) program 111 and a management program 112. The memory 110 further stores, as the data, a script 115, a configuration definition file 116, and host-side conversion information 117. The script 115 includes a command of the management program 112. The configuration definition file 116 defines a configuration of the storage system 300. The host-side conversion information 117 indicates association between a virtual storage area and a logical storage area in the storage system 300. The UI program 111 is, for example, a shell or a command line interpreter and passes a command described in the script 115 or a command input from the user to the management program 112. The UI program 111 may execute the script 115 according to a schedule set in advance. The management program 112 communicates with the storage system 300 according to the command passed from the UI program 111 using the configuration definition file 116 and the host-side conversion information 117.

The storage system 300 includes a plurality of storage devices (storage sub-systems) 400. The plurality of storage devices 400 are connected to one another via a communication network such as a SAN 220. Each of the storage devices 400 includes a DKC (Disk Controller) 500 and a disc 900. The disc 900 includes a storage medium such as HDD (Hard Disk Drive) or a flash memory. The DKC 500 controls the storage device 400. The DKC 500 includes a memory 510, an MP (Microprocessor) 520, CHAs (Channel Adapters) 530a and 530b, and a DKA (Disk Adapter) 540. The memory 510 stores a program(s) and data for a process of the DKC 500. The memory 510 includes a cache memory that temporary stores data communicated to the host computer 100, the disc 900, and other DKCs 500. The MP 520 executes the process according to the program(s) stored in the memory 510. The CHA 530a is connected to the host computer 100 via the SAN 210 and communicates with the host computer 100 according to an instruction from the MP 520. The CHA 530b is connected to another DKC 500 via the SAN 220 and communicates with the DKC 500 according to an instruction from the MP 520. The DKA 540 is connected to the disc 900 and communicates with the disc 900 according to an instruction from the MP 520.

In the following description, when two storage devices 400 in the storage system 300 are described individually, they may be referred to as a storage device (X) and a storage device (Y).

The memory 510 further stores, as the program(s), a control program 512. The memory 510 further stores, as the data, DKC-side conversion information 517. The DKC-side conversion information 517 indicates association between a virtual storage area and a logical storage area in the storage device 400. The control program 512 creates a logical volume (Logical Device: LDEV) based on the storage medium in the disc 900 according to an instruction from the host computer 100, creates a pair of LDEVs for mirroring, and makes a copy of data in the storage device 400 or the plurality of storage devices 400. Further, the control program 512 virtualizes the storage device 400.

The program(s) stored in each of the host computer 100 and the DKC 500 may be stored in a computer readable medium. In this case, each computer read the program(s) out from the medium and installs it/them.

The following description may be made using a "program" as a subject. However, the following description can be made using a "processor" as a subject because a determined process is performed by executing a program by a processor using a memory and a communication port (communication control device). Moreover, the process disclosed using a program as a subject can be a process performed by a computer such as a host computer or a DKC or an information processing device. Furthermore, some or all of the programs may be realized by a dedicated hard ware.

In the following description, a virtual LDEV provided for the host computer 100, from the storage system 300, is also referred to as a virtual volume (V-LDEV: Virtual-Logical Device). Moreover, a virtual DKC provided for the host computer 100, from the storage system 300, is also referred to as a virtual DKC (V-DKC: Virtual-Disk Controller). In order to distinguish between these virtual releases and real releases, an LDEV that can be allocated to a V-LDEV is also referred to as a real volume (R-LDEV: Real-Logical Device), and a DKC 500 that can be allocated to a V-DKC is also referred to as a real DKC (R-DKC: Real-Disk Controller). Moreover, in the case where the R-LDEV and the V-LDEV are not distinguished, each of them is also referred to as an LDEV. Further, in the case where the R-DKC and the V-DKC are not distinguished, each of them is also referred to as a DKC. In order to distinguish between an R-DKC in the storage device (X) and an R-DKC in the storage device (Y), the R-DKC in the storage device (X) is also referred to as an R-DKC (X), and the R-DKC in the storage device (Y) is also referred to as an R-DKC (Y). In the expression of the present invention, the DKC 500 is also referred to as a controller, and the disc 900 is also referred to as a storage device. Moreover, the R-DKC (X) is also referred to as a first controller, the R-DKC (Y) is also referred to as a second controller, the disc 900 connected to the R-DKC (X) is also referred to as a first storage device, and the disc 900 connected to the R-DKC (Y) is also referred to as a second storage device.

The configuration of the computer system is modified by adding a storage device 400 to the storage system 300. In the following description, a configuration in which a storage system 300 includes only one storage device (X), and does not provide a host computer 100 with a virtual storage device is referred to as a non-virtualization configuration. Moreover, a configuration in which another storage device (Y) is added to the storage system 300, and the storage system 300 provides a host computer 100 with a virtual storage device is referred to as a virtualization configuration. One storage device may include an R-DKC (X) connected to a host computer 100, the disc 900 connected to the R-DKC (X), an R-DKC (Y) connected to the host computer 100 and the R-DKC (X), and the disc 900 connected to the R-DKC (Y). For example, the R-DKC (Y) and the disc 900 connected to the R-DKC (Y) may be added to the storage device (X), and the storage device (X) may provide the host computer 100 with a virtual storage device.

A computer system having a non-virtualization configuration is described below.

Figure 2:
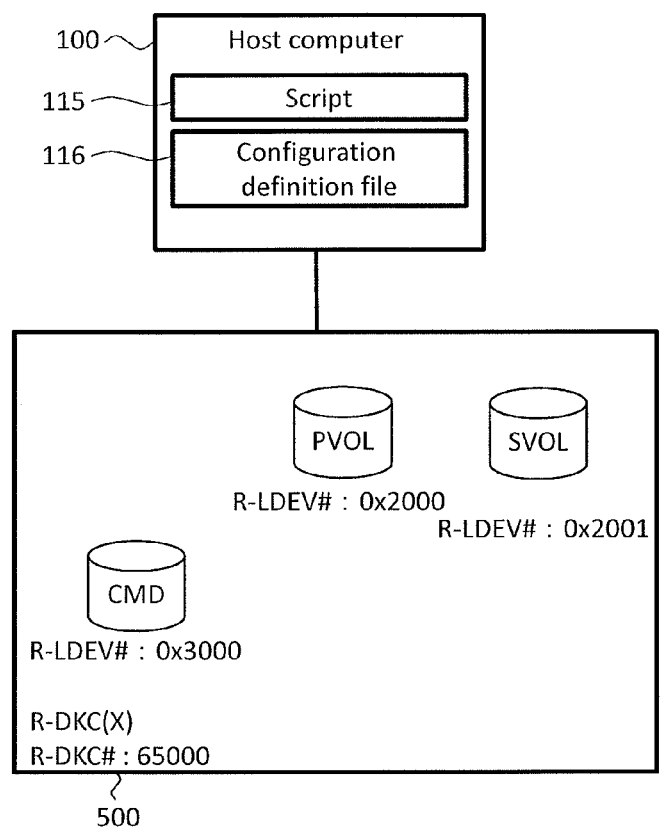
FIG. 2 depicts a configuration of LDEV in a non-virtualization configuration.

FIG. 2 depicts a configuration of an LDEV in a non-virtualization configuration.

In the non-virtualization configuration, the host computer 100 does not require host-side conversion information 117. Moreover, in the non-virtualization configuration, the R-DKC (X) does not require DKC conversion information 517.

The control program 512 in the R-DKC (X) allocates a storage medium in the disc 900 to the R-LDEV and controls the R-LDEV. In this case, the control program 512 may allocate a storage area in a RAID group using the disc 900 to the R-LDEV. The control program 512 may allocate the storage area from a storage area pool in the disc 900 to the R-LDEV using a function of thin provisioning when writing occurs. The control program 512 creates a command device (Command Device: CMD) that is an R-LDEV that receives a command from the host computer 100. The R-DKC (X) creates a pair of R-LDEVs. In the pair, the R-LDEV to be copied is referred to as a PVOL (Primary Volume), and the destination R-LDEV is referred to as an SVOL (Secondary Volume).

Figure 3:
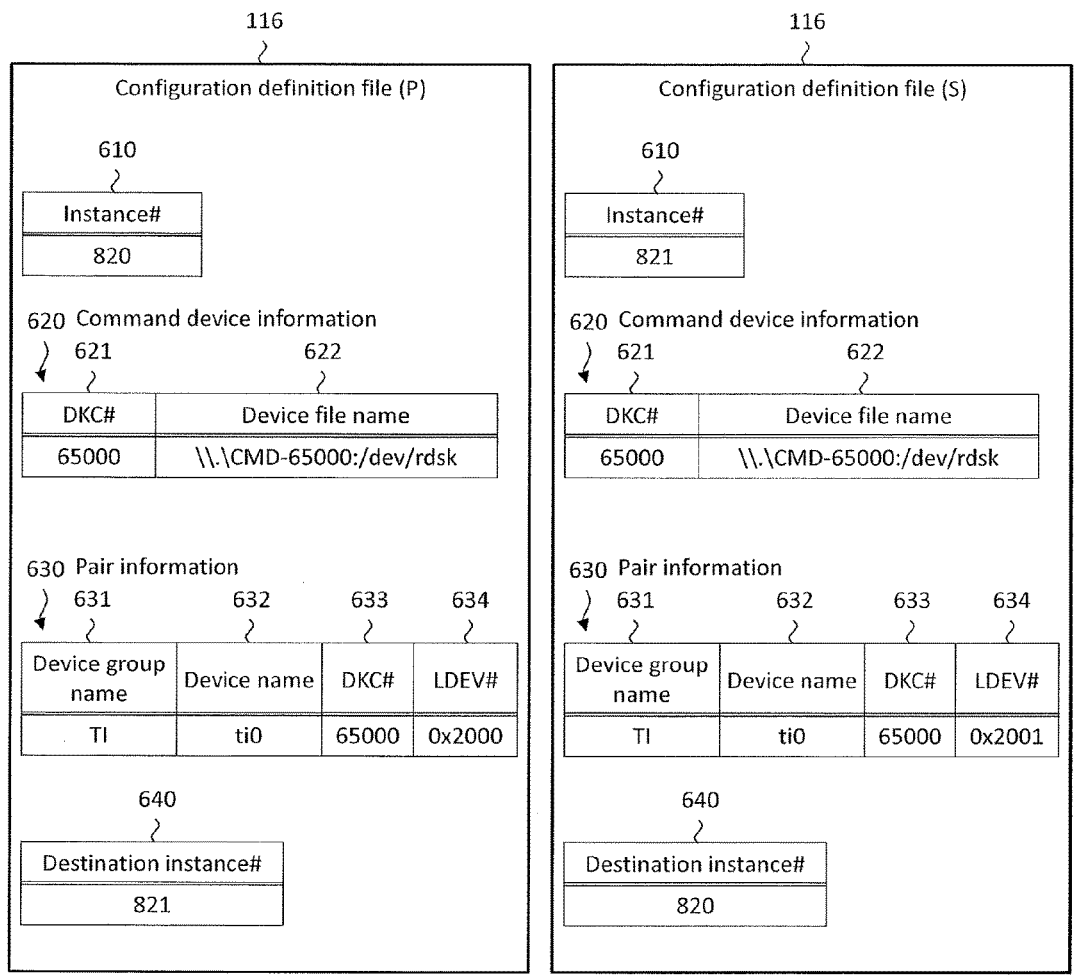
FIG. 3 depicts a configuration definition file 116 in a non-virtualization configuration.

FIG. 3 depicts a configuration definition file 116 in a non-virtualization configuration.

FIG. 3 depicts a configuration definition file (P) that is a configuration definition file 116 corresponding to a PVOL and a configuration definition file (S) that is a configuration definition file 116 corresponding to an SVOL. One configuration definition file 116 represents one LDEV, and a device in the configuration definition file 116 represents a pair of LDEVs. The configuration definition file 116 includes an instance number (#) 610 representing an LDEV, command device information 620 indicating a command device of an R-DKC corresponding to the LDEV, pair information 630 to which the LDEV belongs, and a destination instance number (#) 640 that is an identifier of a destination LDEV that is an LDEV to be paired with the LDEV.

The command device information 620 includes an entry per an R-DKC that can control the LDEV. The entry of one R-DKC includes a DKC number (#) 620 that identifies the R-DKC and a device file name 622 that indicates a destination of a command from the host computer 100 to a command device of the R-DKC. The device file name 622 is described in a form of being recognizable by the host computer 100. The command device information 620 in the non-virtualization configuration includes one entry. The pair information 630 includes a device group name 631 indicating a device group to which the pair belongs, a device name 632 indicating the pair, a DKC number (#) 633 that identifies a DKC that controls the pair, and an LDEV number (#) 634 that identifies the LDEV. The device group name 631 and the device name 632 are set by a user. The device group is used for collective management of a plurality of devices. The pair is identified by a combination of the device group name 631 and the device name 632. Each of the DKC number 621 and the DKC number 633 is, for example, a serial number (device serial number) of the DKC. Other identifiers may be used as substitute for the DKC numbers, the LDEV numbers, and the instance numbers.

In the non-virtualization configuration, one configuration definition file 116 represents one R-LDEV, and a device represents a pair of R-LDEVs. That is, the LDEV number 634 represents an R-LDEV, and the DKC number 633 represents an R-DKC.

According to such configuration definition file, PVOL and SVOL in the pair of V-LDEVs can be associated with each other and managed.

An operation of the computer system having a non-virtualization configuration is described below.

In the host computer 100, when the UI program 111 issues a user command to the management program 112, the management program 112 performs a storage instruction process. The user command is a command for the management program 112 and corresponds to a storage management command for the storage device 400. The storage management command is a command for managing an R-LDEV in the storage device 400 and includes a pair management command for managing a pair in the storage device 400. The pair management command designates a pair of R-LDEVs and instructs a DKC 500 to execute a pair management process targeting to the R-LDEVs. The pair management process includes a pair operation that changes control information of the pair and a pair reference that does not change control information of the pair. The case where the user command corresponds to the pair management command is described below and can however be applied to the case where the user command corresponds to another storage management command.

Figure 4:
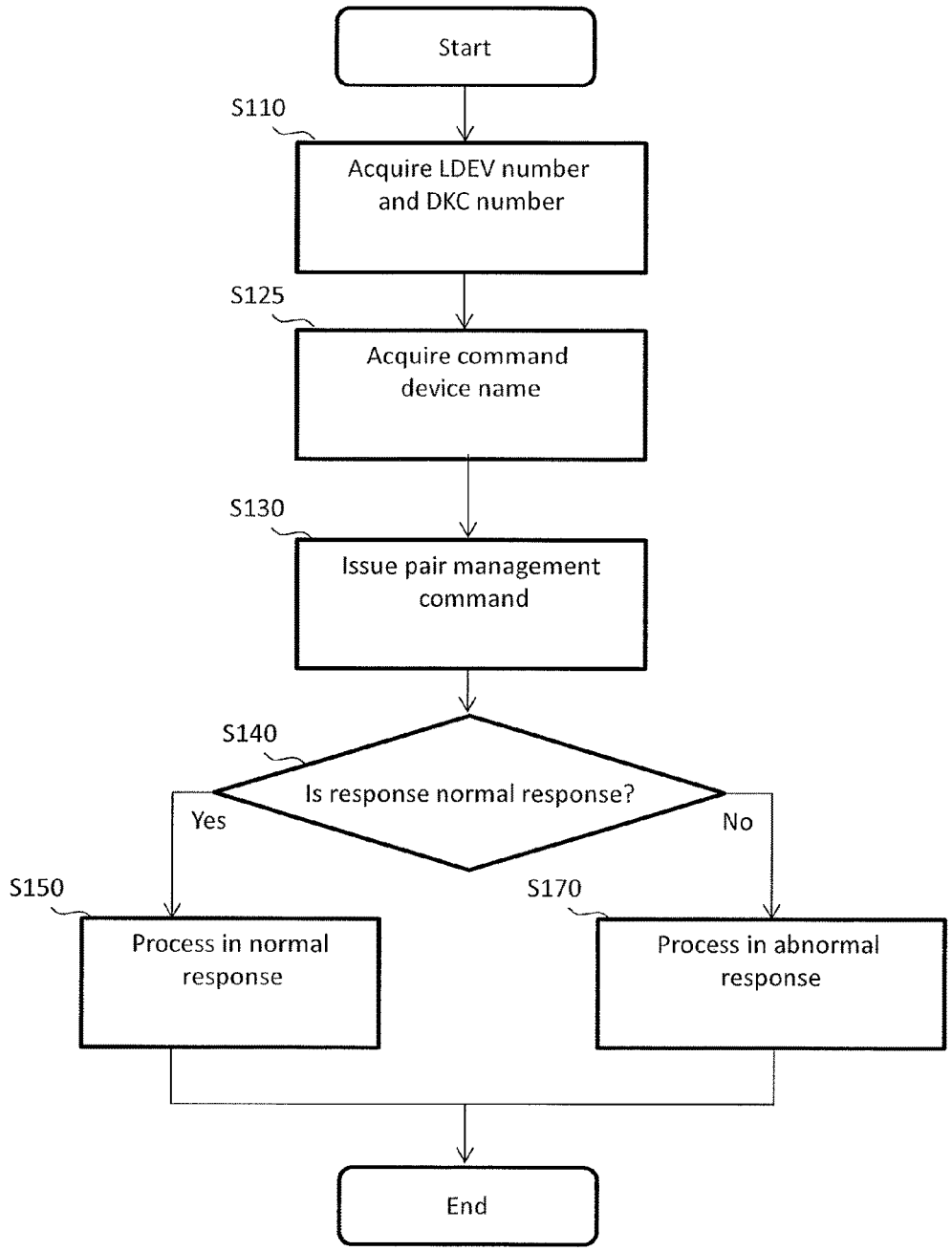
FIG. 4 depicts a storage instruction process in a host computer 100 having a non-virtualization configuration.

FIG. 4 depicts a storage instruction process in a host computer 100 having a non-virtualization configuration.

In a non-virtualization configuration, the pair information 630 in a configuration definition file 116 associates a pair of R-LDEVs with a device group name and a device name. A user command designates, as arguments, the device group name and the device name of a target pair that is a pair to be a target.

In S110, a management program 112 refers to pair information 630 in a configuration definition file 116 and acquires, from a device group name 631 and a device name 632 of a target pair, an LDEV number 634 of a target LDEV that is an LDEV belonging to the target pair and a DKC number 633 of a target DKC associated with the target pair. In this case, the acquired LDEV number is an R-LDEV number, and the acquired DKC number is an R-DKC number. The target DKC is a DKC 500 that controls the target pair.

Afterward, in S125, the management program 112 refers to command device information 620 in the configuration definition file 116 and acquires a device file name 622 corresponding to the acquired R-DKC number. Afterward, in S130, the management program 112 sends a pair management command that designates the R-LDEV number of the acquired target pair as an argument to the acquired device file name as a destination.

Afterward, in S140, the management program 112 receives a response to the pair management command from the target DKC and determines whether or not the response is a normal response.

When it is determined that the response is a normal response in S140 (Yes), the management program 112 executes a process at the time of normal response in S150 to end this flow. Embodiments of the process at the time of normal response include message creation and log output.

When it is determined that the response in an abnormal response in S140 (No), the management program 112 executes a process at the time of abnormal response in S170 to end this flow. Embodiments of the process at the time of abnormal response include an internal retry, message creation, and log output.

According to the flow described above, the management program 112 can convert the user command to the pair management command. Thus, the user can use, in the user command, the device group name and the device name set in the configuration definition file by the user. Thus, the management becomes easy.

When the DKC 500 receives the pair management command from the host computer 100 according to the storage instruction process, the control program 512 performs a storage control process.

Figure 5:
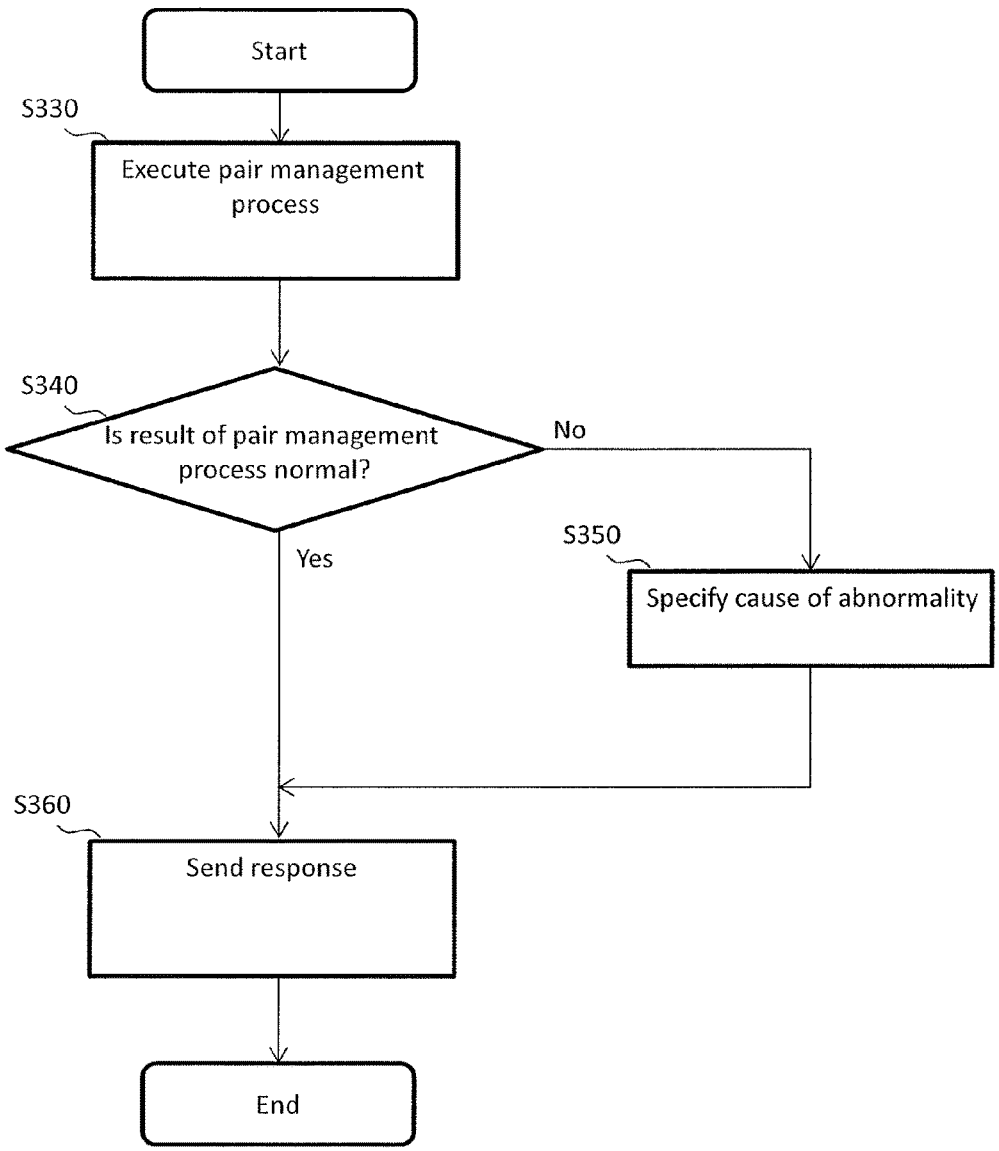
FIG. 5 depicts a storage control process in a DKC 500 having a non-virtualization configuration.

FIG. 5 depicts a storage control process in a DKC 500 having a non-virtualization configuration.

In S330, a control program 512 executes a pair management process designated by a pair management command on an R-LDEV designated by the pair management command. Afterward, in S340, the control program 512 determines whether the result of the pair management process has normality or abnormality. For example, when the parameter(s) designated by the pair management command has abnormality, the result of the pair management process becomes abnormal.

When it is determined that the result of the pair management process has normality in S340 (Yes), the control program 512 sends, to the host computer 100, a response of the pair management command indicating the result of the pair management process in S360 to end this flow.

When it is determined that the result of the pair management process has abnormality (No) in S340, the control program 512 specifies a cause of the abnormality and sets an error code corresponding to the specified cause, and the process is transferred to S360, in S350.

According to the above-described flow, the DKC 500 can execute the pair management process according to the instruction from the host computer 100. When the result of the pair management process has abnormality, the DKC 500 can notify the error code indicating the cause of the abnormality to the host computer 100.

Figure 6:
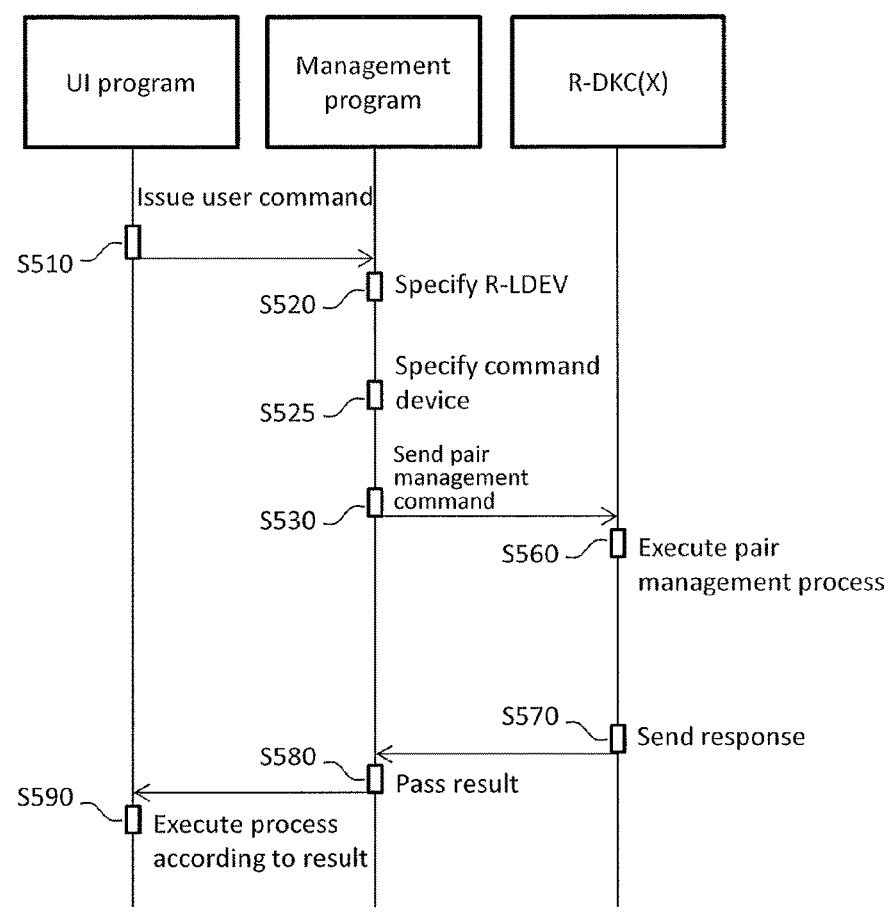
FIG. 6 depicts an operation of a computer system based on a storage instruction process in a non-virtualization configuration.

FIG. 6 depicts an operation of a computer system based on a storage instruction process in a non-virtualization configuration.

FIG. 6 depicts an operation sequence of a UI program 111 in a host computer 100, a management program 112 in the host computer 100, and a control program 512 in an R-DKC (X).

In S510, the UI program 111 in the host computer 100 acquires a user command from a script 115 or an input unit 140 and issues the user command to the management program 112.

Afterward, in S520, the management program 112 specifies an R-LDEV of the target LDEV belonging to the target pair indicated in the user command and an R-DKC (X) corresponding to the R-LDEV on the basis of the configuration definition file 116. Afterward, in S525, the management program 112 specifies a command device of the R-DKC (X) on the basis of the configuration definition file 116. Afterward, in S530, the management program 112 sends a pair management command for management of the target R-LDEV to the command device of the R-DKC (X).

Afterward, in S560, the control program 512 of the R-DKC (X) receives the pair management command from the host computer 100 and performs a pair management process on the target R-LDEV. Afterward, in S570, the control program 512 sends a response indicating a result of the pair management process to the host computer 100.

Afterward, in S580, the management program 112 of the host computer 100 receives the result of the pair management process from the R-DKC (X) and passes the result to the UI program 111. Afterward, in S590, the UI program 111 executes a process corresponding to the result of the pair management process and ends this sequence.

According to the sequence, the R-DKC (X) corresponding to the target R-LDEV can be caused to execute the pair management process of the target R-LDEV designated by the user command.

The computer system having a virtualization configuration is described below.

In a virtualization configuration, a storage system 300 provides a host computer 100 with a V-DKC (Z) and allocates either the R-DKC (X) or the R-DKC (Y) to the V-DKC (Z). In this virtualization configuration, it is assumed that the storage system 300 provides the V-DKC (Z) and a V-LDEV, and a data migration of copying data of R-LDEV corresponding to the V-LDEV from the storage device (X) to the storage device (Y) is performed. By this data migration, a load of the storage device (X) can be dispersed. Adding the storage device (Y) to the storage system 300 having the storage device (X) and performing data migration from the storage device (X) to the storage device (Y) are collectively called scale out. The storage system 300 may perform data migration according to the storage management command from the host computer 100 or data migration on the basis of the state of the storage system 300 such as a load of the storage device (X).

In the computer system, the state before or during this data migration is referred to as the state A, the state after the data migration and before the update of the host-side conversion information 117 is referred to as the state B, and the state after the data migration and the update of the host-side conversion information 117 is referred to as the state C.

Figure 7:
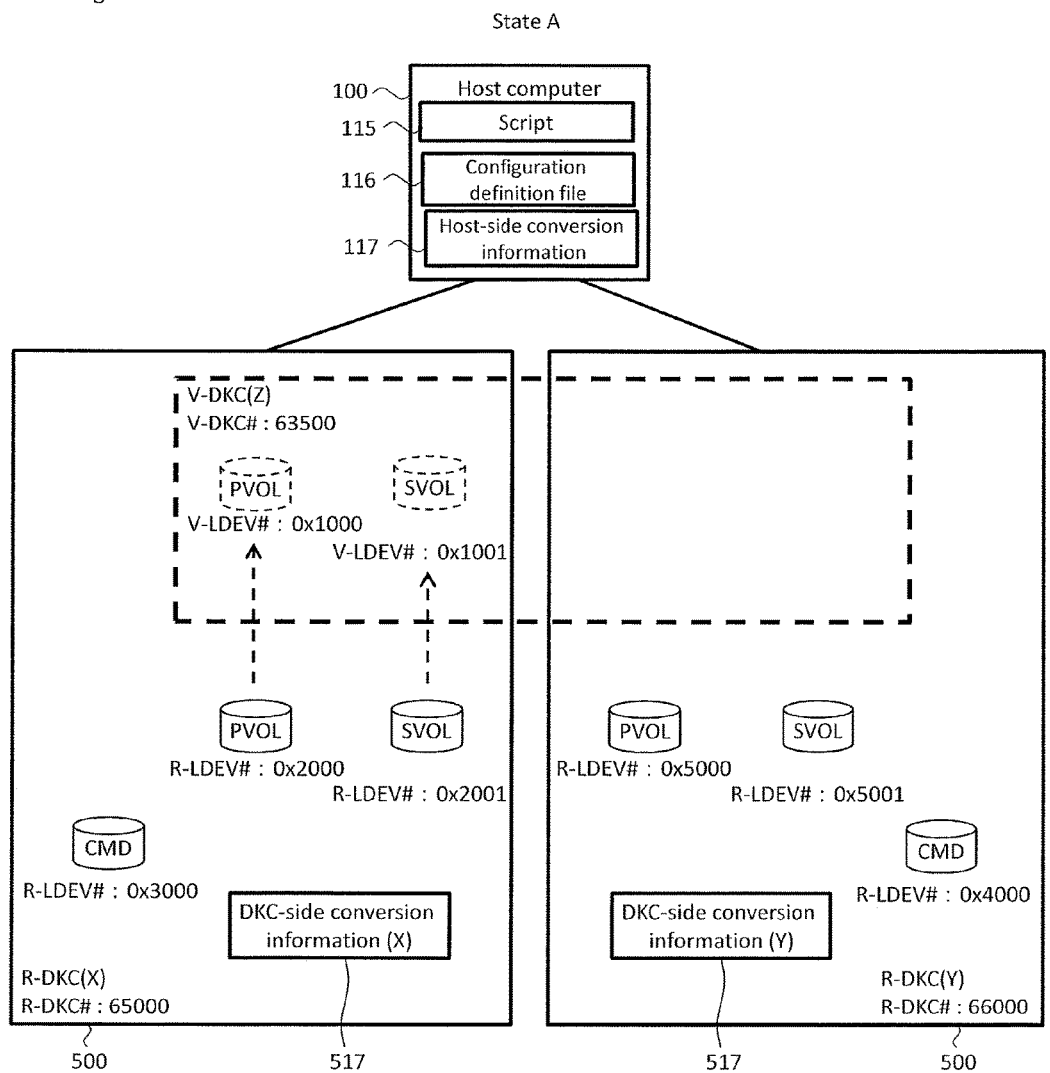
FIG. 7 depicts configurations of a V-LDEV and an R-LDEV in the state A of a virtualization configuration.

FIG. 7 depicts configurations of a V-LDEV and an R-LDEV in the state A of a virtualization configuration.

In the state A, the control program 512 allocates an R-DKC (X) to a V-DKC (Z). The control program 512 further allocates an R-LDEV #0x2000 (PVOL) and an R-LDEV #0x2001 (SVOL) that are a pair in the storage device (X) to a V-LDEV #0x1000 (PVOL) and a V-LDEV #0x1001 (SVOL), respectively.

Figure 8:
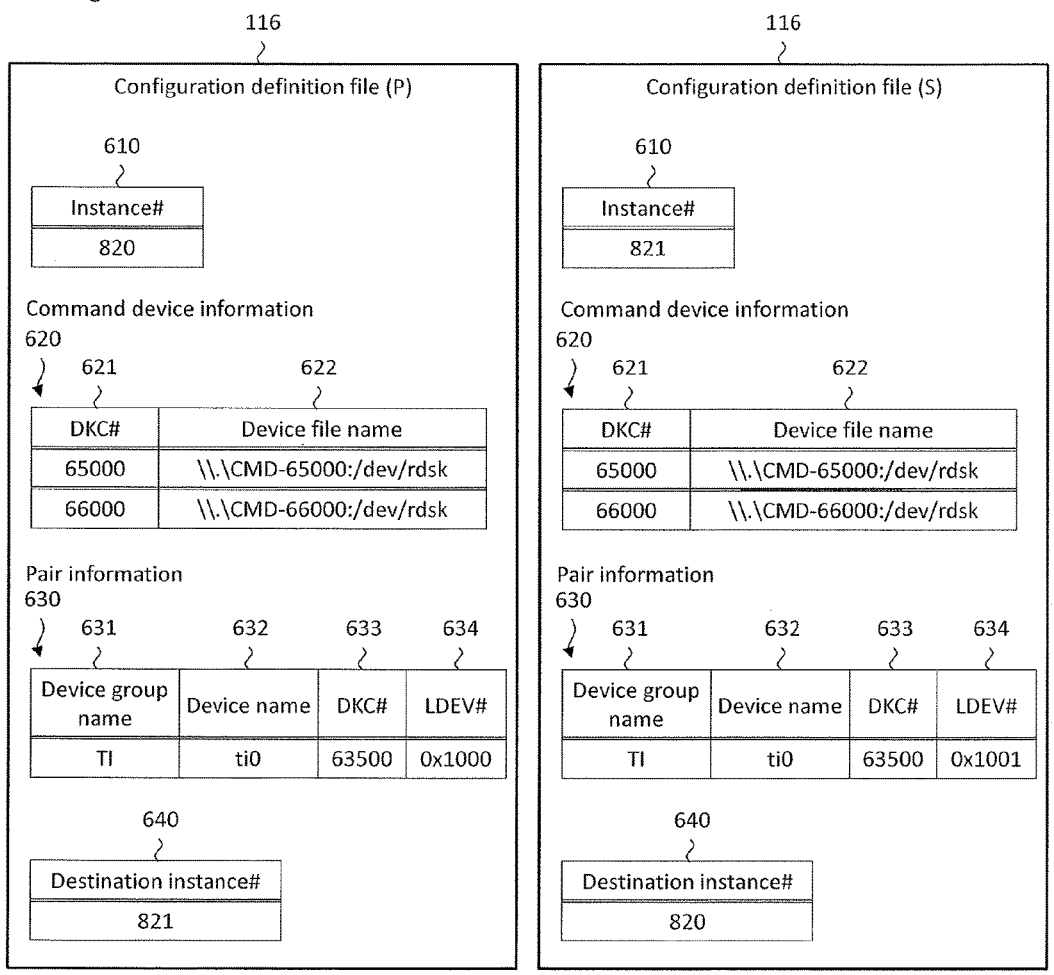
FIG. 8 depicts a configuration definition file 116 in a virtualization configuration.

FIG. 8 depicts a configuration definition file 116 in a virtualization configuration.

FIG. 8 depicts a configuration definition file (P) that is the configuration definition file 116 corresponding to a PVOL and a configuration definition file (S) that is the configuration definition file 116 corresponding to an SVOL. In the virtualization configuration, one configuration definition file 116 represents one V-LDEV, and a device in the configuration definition file 116 represents a pair of V-LDEVs. That is, the LDEV number 634 represents a V-LDEV, and the DKC number 633 represents a V-DKC.

The command device information 620 in the virtualization configuration has a plurality of entries. Comparing the virtualization configuration and the non-virtualization configuration, a device file name of the command device of R-DKC(Y) is added to the command device information 620 in the virtualization configuration. Thus, the command device information 620 indicates command devices of the R-DKC (X) and the R-DKC (Y) each of which can be allocated to the V-DKC. The pair information 630 in the configuration definition file 116 indicates a V-LDEV and a V-DKC. In the pair information 630 in the configuration definition file (P), the DKC number 633 is changed to the number of V-DKC (Z), the LDEV number 634 is changed to V-LDEV #0x1000 that is a destination of allocation of R-LDEV #0x2000. Similarly, in the pair information 630 in the configuration definition file (S), the DKC number 633 is changed to the number of V-DKC (Z), and the LDEV number 634 is changed to V-LDEV #0x1001 that is a destination of allocation of R-LDEV #0x2001.

When the storage system 300 in the non-virtualization configuration is changed to the storage system 300 in the virtualization configuration by adding the storage device (Y), the storage system 300 can be used in the virtualization configuration without changing a script 115 in the non-virtualization configuration by setting the device group name and the device name of the pair in the non-virtualization configuration to the pair corresponding to that in the virtualization configuration.

In the virtualization configuration, the control program 512 creates DKC-side conversion information 517 and stores it in a memory 510. Moreover, the management program 112 creates host-side conversion information 117 on the basis of the DKC-side conversion information 517 and stores it in the memory 510. For example, the management program 112 receives the DKC-side conversion information 517 by sending a conversion information request command described below to the storage device (X) and the storage device (Y) and creates the host-side conversion information 117 by merging the received DKC-side conversion information 517.

FIG. 9 depicts host-side conversion information 117 and DKC-side conversion information 517 in the state A of a virtualization configuration.

FIG. 9 depicts the host-side conversion information 117 stored in a host computer 100, DKC-side conversion information (X) that is the DKC-side conversion information 517 stored in an R-DKC (X), and DKC-side conversion information (Y) that is DKC-side conversion information 517 stored in an R-DKC (Y).

Each of the host-side conversion information 117 and the DKC-side conversion information 517 includes an entry by R-LDEV. The entry of one R-LDEV includes the R-LDEV number (#) 711 that identifies the R-LDEV, the R-DKC number (#) 712 that identifies an R-DKC that controls the R-LDEV, the V-LDEV number (#) 713 that identifies the V-LDEV that is a destination of allocation of the R-LDEV, and the V-DKC number (#) 714 that identifies the V-DKC that is a destination of allocation of the R-DKC.

In the state A, the DKC-side conversion information (X) indicates a pair of R-LDEVs corresponding to a pair of V-LDEVs. In the state A, R-LDEV #0x5000 (PVOL) and R-LDEV #0x5001 (SVOL) in the storage device (Y) are not allocated to the V-LDEV. Therefore, in the DKC-side conversion information (Y), there is no V-LDEV numbers corresponding to these R-LDEV numbers.

In the state A, the host-side conversion information 117 includes an entry of the DKC-side conversion information (X) and an entry of the DKC-side conversion information (Y). That is, in the state A, the host-side conversion information 117 matches with the DKC-side conversion information (X) and DKC-side conversion information (Y).

In the state A, it is assumed that the control program 512 executes data migration from R-LDEV #0x2000 (PVOL) and R-LDEV #0x2001 (SVOL) in the storage device (X) to R-LDEV #0x5000 (PVOL) and R-LDEV #0x5001 (SVOL) in the storage device (Y). Further, the control program 512 updates the DKC-side conversion information 517. This state is referred to as a state B.

Figure 10:
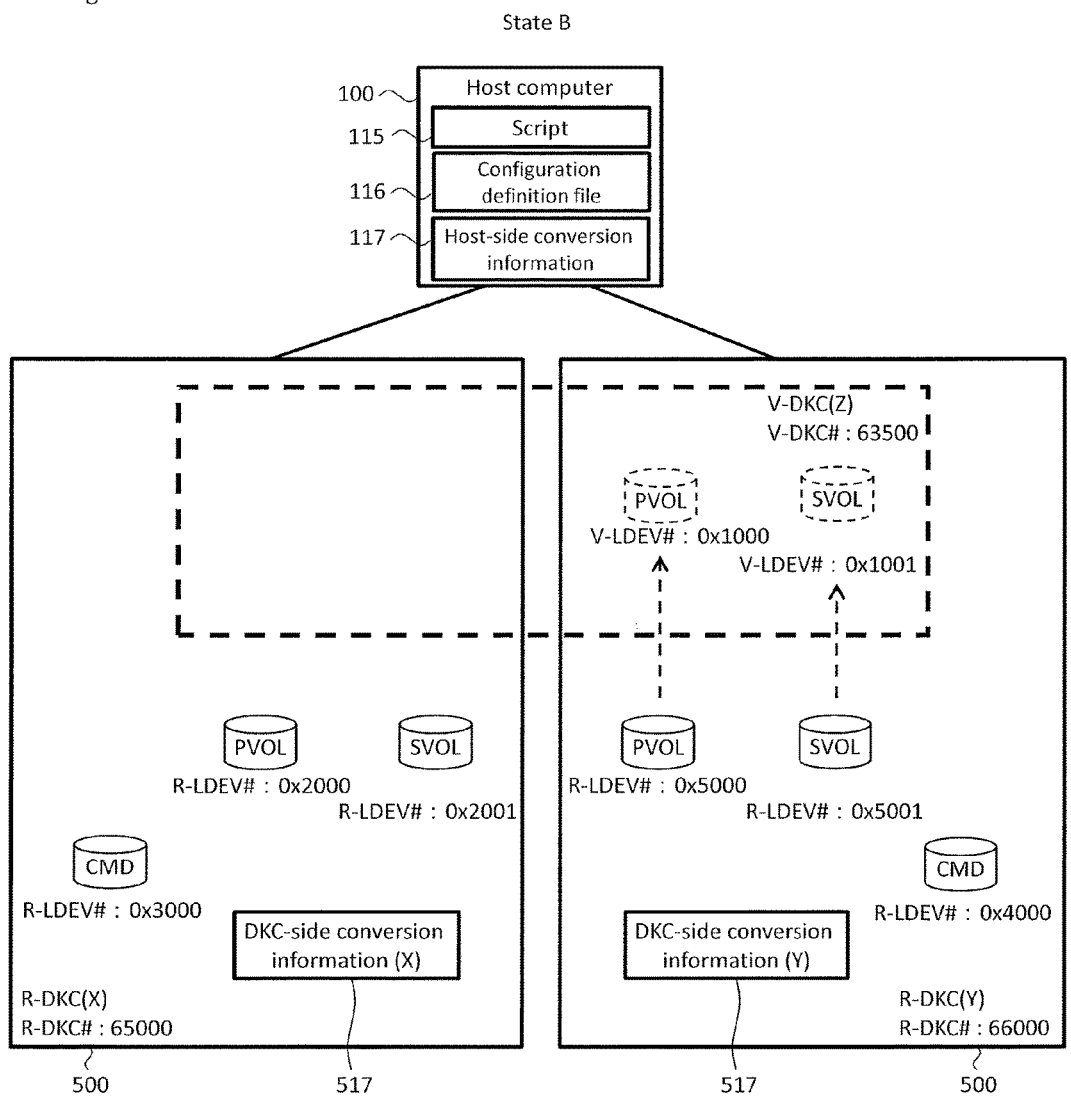
FIG. 10 depicts configurations of a V-LDEV and an R-LDEV in the state B of a virtualization configuration.

FIG. 10 depicts configurations of a V-LDEV and an R-LDEV in the state B of a virtualization configuration.

In the state B, a control program 512 allocates an R-DKC (Y) to a V-DKC (Z). The control program 512 further allocates an R-LDEV #0x5000 (PVOL) and an R-LDEV #0x5001 (SVOL) that are a pair in the storage device (Y) to V-LDEV #0x1000 (PVOL) and V-LDEV #0x1001 (SVOL), respectively.

FIG. 11 depicts host-side conversion information 117 and DKC-side conversion information 517 in the state B of a virtualization configuration.

In the state B, the DKC-side conversion information (Y) indicates a pair of R-LDEVs corresponding to a pair of V-LDEVs. In the state B, R-LDEV #0x2000 (PVOL) and R-LDEV #02001 (SVOL) in the storage device (X) are not allocated to a V-LDEV. Therefore, in the DKC-side conversion information (X), there is no V-LDEV numbers corresponding to these R-LDEV numbers.

The host-side conversion information 117 in the state B is the same as the host-side conversion information 117 in the state A because the host-side conversion information 117 in the state B is not updated. That is, in the state B, the host-side conversion information 117 matches with the DKC-side conversion information (X) and the DKC-side conversion information (Y).

Afterward, the management program 112 acquires the DKC-side conversion information (X) and the DKC-side conversion information (Y) from the storage system 300 and updates the host-side conversion information 117 on the basis of the DKC-side conversion information (X) and the DKC-side conversion information (Y). This state is referred to as a state C. The configurations of the V-LDEV and the R-LDEV in the state C are the same as those in the state B.

FIG. 12 depicts host-side conversion information 117 and DKC-side conversion information 517 in the state C of a virtualization configuration.

The DKC-side conversion information (X) and the DKC-side conversion information (Y) in the state C are the same as those in the state B.

In the state C, the host-side conversion information 117 includes entries of DKC-side conversion information (X) and the DKC-side conversion information (Y). That is, in the state C, the host-side conversion information 117 matches with the DKC-side conversion information (X) and the DKC-side conversion information (Y).

The operation of the computer system having a virtualization configuration is described below.

Figure 13:
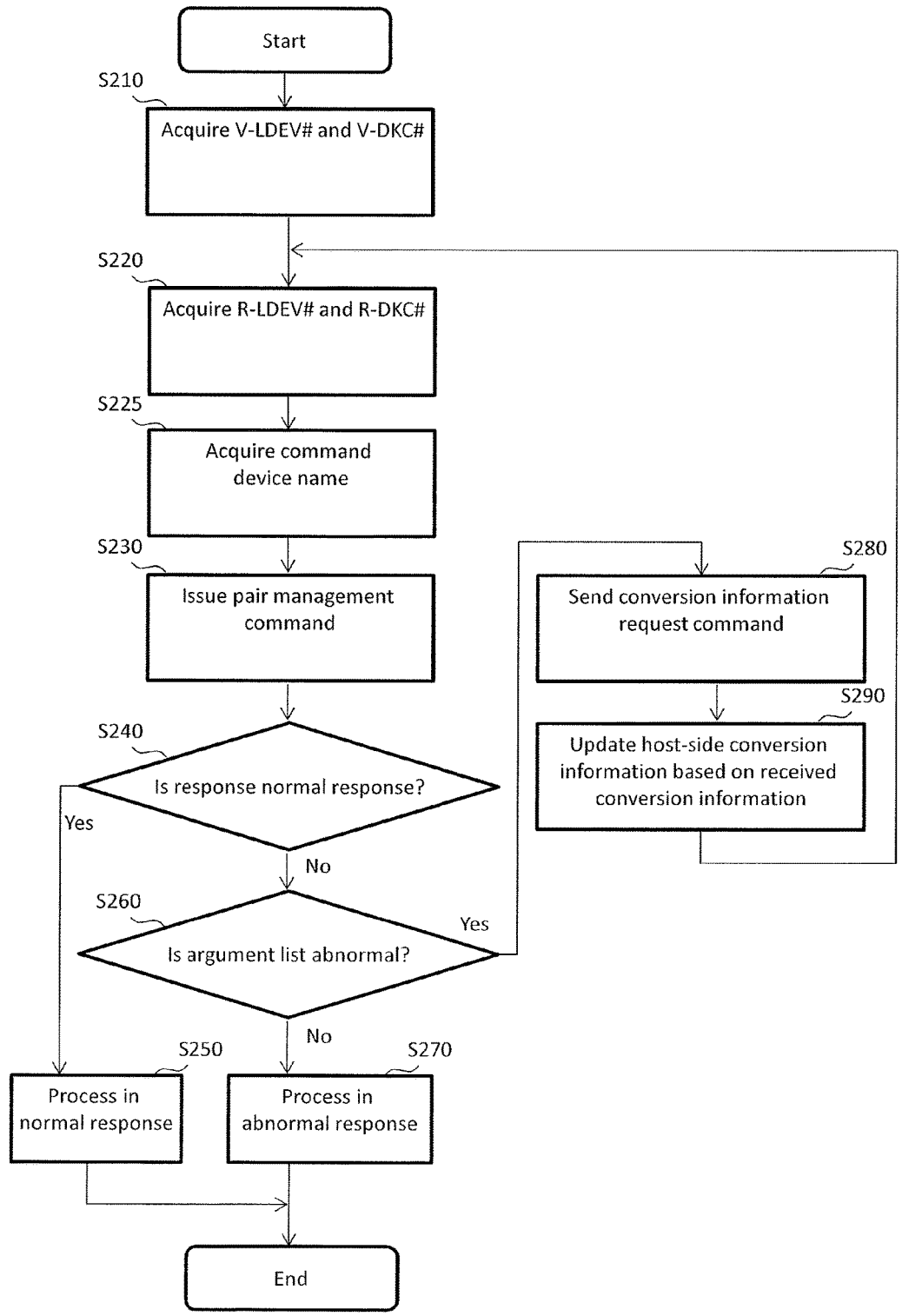
FIG. 13 depicts a storage instruction process in a host computer 100 having a virtualization configuration.

FIG. 13 depicts a storage instruction process in a host computer 100 having a virtualization configuration.

In the state B, the device group name and the device name are associated with a V-LDEV by the pair information 630 in the configuration definition file 116. The user command designates the device group name and the device name of the target pair as arguments.

In S210, a management program 112 refers to pair information 630 in a configuration definition file 116 and acquires, from a device group name 631 and a device name 632 of a target pair, an LDEV number 634 of a target LDEV that is an LDEV belonging to the target pair and a DKC number 633 of a target DKC associated with the target pair. The acquired LDEV number is the V-LDEV number, and the acquired DKC number is the V-DKC number.

Afterward, in S220, the management program 112 refers to host-side conversion information 117 and acquires an R-LDEV number 711 of the target LDEV and an R-DKC number 712 of the target DKC, associated with the V-LDEV number 713 of the target LDEV and the V-DKC number 714 of the target DKC, respectively.

Afterward, in S230, the management program 112 refers to command device information 620 in the configuration definition file 116, acquires a device file name 622 corresponding to the acquired R-DKC number, and sends the pair management command designating the V-DKC number of the target DKC and the R-LDEV number and the V-LDEV number of the target pair as an argument list to the acquired device file name as a destination.

Afterward, in S240, the management program 112 receives a response to the pair management command from the target DKC and determines whether or not the response is a normal response. For example, in the state B, the response is an abnormal response.

When it is determined that the response is a normal response in S240 (Yes), the management program 112 executes a process at the time of normal response and ends this flow in S250.

When it is determined that the response is an abnormal response in S240 (No), the management program 112 determines whether or not the abnormal response indicates an abnormality in the argument list in S260. For example, when an error code contained in the abnormal response corresponds to an abnormality in the argument list, the management program 112 determines that the abnormal response indicates an abnormality in the argument list. In this case, it is determined that the argument list has an error because the target DKC does not match with the DKC conversion information 517 in the target DKC. In the state B, a response from the R-DKC (X) is an abnormal response indicating an abnormality in the argument list.

When it is determined that the abnormal response does not indicate an abnormality in the host-side conversion information 117 in S260 (No), the management program 112 executes a process at the time of abnormal response and ends this flow in S270.

When it is determined that the abnormal response indicates an abnormality in the host-side conversion information 117 in S260 (Yes), the management program 112 sends a conversion information request command that requests conversion information that is the contents of the DKC-side conversion information 517 to all of command devices indicated in the configuration definition file 116 in S280. The conversion information request command includes the V-LDEV number and the R-LDEV number corresponding to the target LDEV. The DKC 500 sends only an entry including at least one of the V-LDEV number and the R-LDEV number of the target LDEV in the DKC-side conversion information 517 to the host computer 100 according to the conversion information request command. Afterward, in S290, the management program 112 receives the conversion information from the command device, merges the received conversion information to create novel host-side conversion information 117, stores the novel host-side conversion information 117 in a memory 110, and transfer the process to S220.

According to the flow, the host computer 100 can specify the script 115, or the user can specify the R-LDEV and the R-DKC corresponding to the target pair in the pair management process regardless of before and after the data migration. Accordingly, the host computer 100 can send the pair management command that designates the R-LDEV to the R-DKC. When the host-side conversion information 117 does not match with the DKC-side conversion information 517 of the target DKC, the host-side conversion information 117 can match with the novel DKC-side conversion information 517 by sending a request of the DKC-side conversion information 517 to DKC 500 by the host computer 100. The size of the conversion information sent from the DKC 500 can be reduced by designating the target LDEV in the DKC-side conversion information 517 by the conversion information request command and sending only the conversion information corresponding to the target LDEV in the DKC-side conversion information 517 by the DKC 500.

When the DKC 500 receives a pair management command from the host computer 100 according to the storage instruction process, the control program 512 performs a storage control process.

Figure 14:
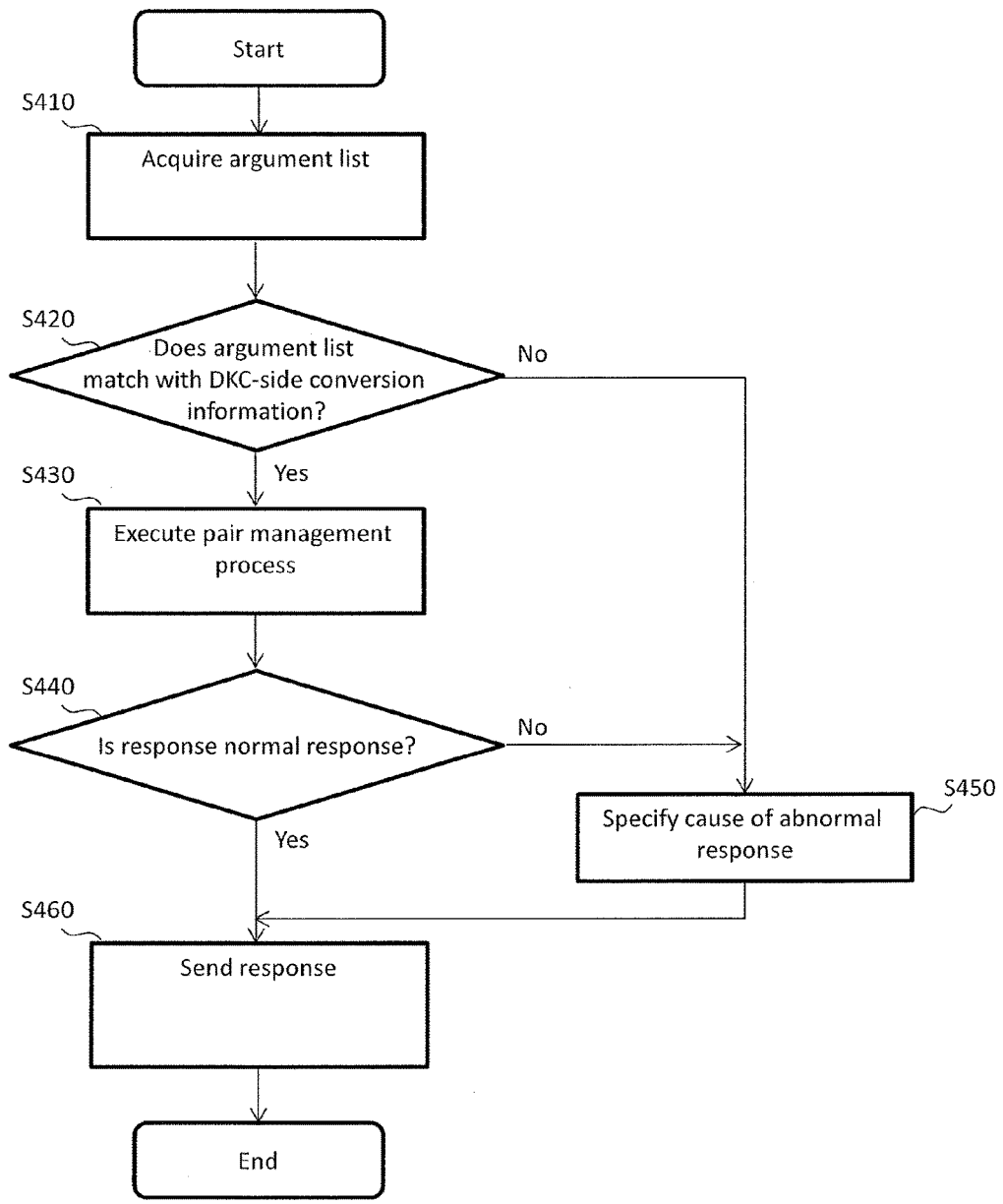
FIG. 14 depicts a storage control process in a DKC 500 having a virtualization configuration.

FIG. 14 depicts a storage control process in a DKC 500 having a virtualization configuration.

In S410, the control program 512 acquires, as an argument list, a combination of the V-DKC number, the V-LDEV number, and the R-LDEV number indicated in arguments of the received pair management command. Afterward, in S420, the control program 512 determines whether or not the argument list matches with the DKC-side conversion information 517. For example, when an entry that matches with the combination of the V-DKC number, the V-LDEV number, and the R-LDEV number indicated in the argument list is in the DKC-side conversion information 517, the control program 512 determines that the argument list matches with the DKC-side conversion information 517. For example, in the states A and C, it is determined that the argument list matches with the DKC-side conversion information. For example, in the state B, it is determined that the argument list does not match with the DKC-side conversion information 517. The argument list may be a combination of the V-LDEV number and the R-LDEV number without including the V-DKC number. Accordingly, the DKC 500 can determine an association between the V-LDEV number and the R-LDEV number in the host-side conversion information 117. When the argument list includes the V-DKC number, even in the case where one DKC 500 includes a plurality of command devices, a command device corresponding to the R-LDEV can be identified.

In S420, when it is determined that the argument list does not match with the DKC-side conversion information 517 (No), the control program 512 sets an error code corresponding to the abnormality in the argument list as a cause of the abnormality in S450. Afterward, in S460, the control program 512 sends a response of the pair management command indicating the result of the pair management process to the host computer 100 and ends this flow.

In S420, when it is determined that the argument list matches with the DKC-side conversion information 517 (Yes), the control program 512 executes a pair management process designated by the pair management command to the R-LDEV designated by the pair management command in S430. In S440, the control program 512 determines whether or not the result of the pair management process is normal.

In S440, when it is determined that the result of the pair management process is normal (Yes), the control program 512 transfers the process to the above-mentioned S460.

In S440, when it is determined that the result of the pair management process is abnormal (No), the control program 512 sets an error code indicating a cause of the abnormality in S450 and transfers the process to the above-mentioned S460.

According to the flow, when the information designated by the pair management command is not included in the DKC-side conversion information 517, the DKC 500 can notify that the host-side conversion information 117 does not match with the DKC conversion information 517 to the host computer 100. The DKC 500 can check that the host-side conversion information 117 matches with the DKC conversion information 517 and perform a pair management process.

FIG. 15 depicts an argument list of a pair management command in each state.

FIG. 15 depicts an argument list 810, DKC-side conversion information (X), and DKC-side conversion information (Y) of a pair management command in each of the states A, B, and C. The argument list 810 of the pair management command includes a combination corresponding to PVOL and a combination corresponding to SVOL for the combination of the V-DKC number (#) 811, the V-LDEV number (#) 812, and the R-LDEV number (#) 814.

In the state A, the management program 112 recognizes that the R-DKC allocated to the V-DKC (Z) is an R-DKC (X) on the basis of the host-side conversion information 117 and sends the pair management command to the R-DKC (X). The DKC-side conversion information (X) in the state A includes an entry in which a combination of the V-DKC number 711, the V-LDEV number 712, and the R-LDEV number 714 matches with a combination of the V-DKC number 811, the V-LDEV number 812, and the R-LDEV number 813 in the argument list 810. Therefore, the control program 512 sends a normal response to the host computer 100.

In the state B, the management program 112 recognizes that the R-DKC allocated to the V-DKC (Z) is an R-DKC (X) on the basis of the host-side conversion information 117 and sends the pair management command to the R-DKC (X). The DKC-side conversion information (X) in the state B does not include an entry in which a combination of the V-DKC number 711, the V-LDEV number 712, and the R-LDEV number 714 matches with a combination of the V-DKC number 811, the V-LDEV number 812, and the R-LDEV number 813 in the argument list 810. Therefore, the control program 512 sends, to the host computer 100, an abnormal response indicating that the argument list 810 has an abnormality.

In the state C, the management program 112 recognizes that an R-DKC allocated to a V-DKC (Z) is an R-DKC (Y) on the basis of the host-side conversion information 117 and sends the pair management command to the R-DKC (Y). The DKC-side conversion information (Y) in the state C includes an entry in which a combination of the V-DKC number 711, the V-LDEV number 712, and the R-LDEV number 714 matches with a combination of the V-DKC number 811, the V-LDEV number 812, and the R-LDEV number 813 in the argument list 810. Therefore, the control program 512 sends a normal response to the host computer 100.

The DKC 500 that receives the pair management command determines the argument list of the pair management command. Thus, the host computer 100 can recognize the state where the host-side conversion information 117 does not match with the DKC-side conversion information 517 after the data migration.

Figure 16:
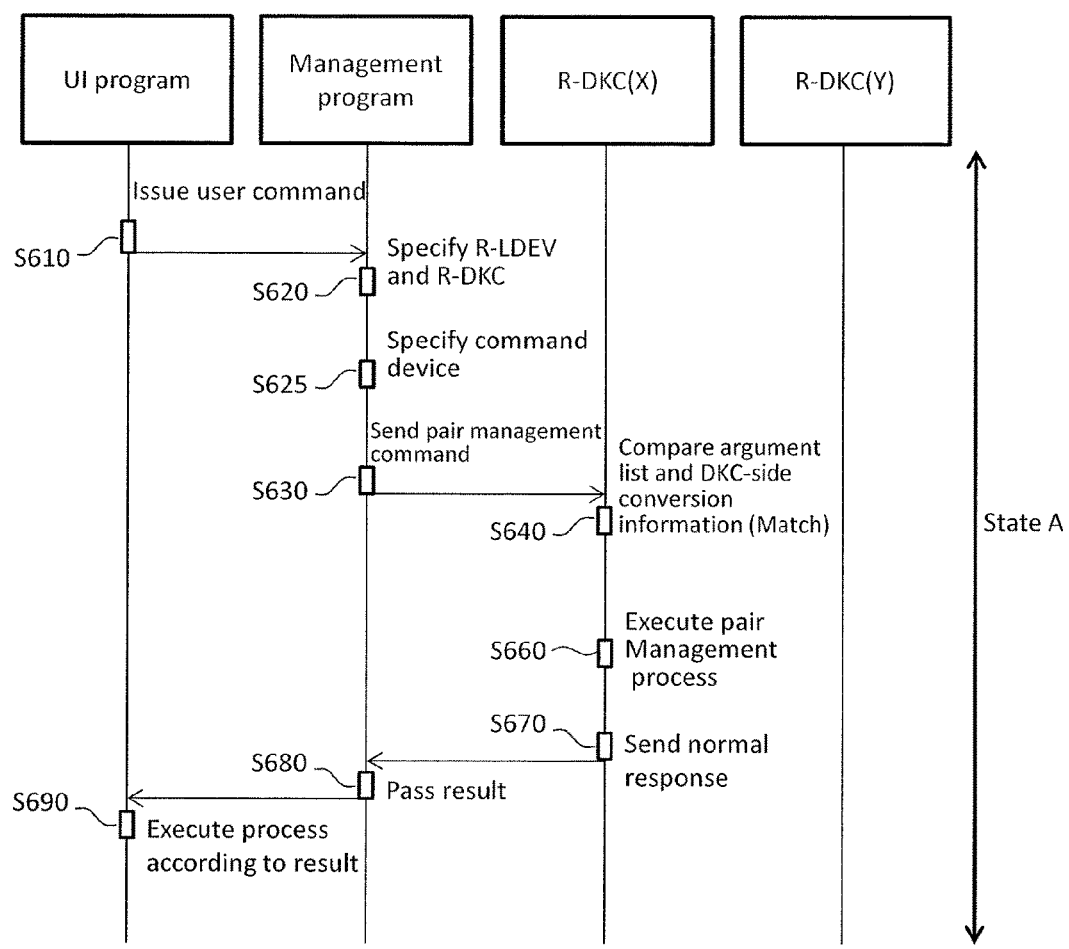
FIG. 16 depicts an operation of a computer system based on a storage instruction process in the state A of a virtualization configuration.

FIG. 16 depicts an operation of a computer system based on a storage instruction process in the state A of a virtualization configuration.

FIG. 16 depicts an operation sequence of a UI program 111 in a host computer 100, a management program 112 in the host computer 100, a control program 512 in an R-DKC (X), and a control program 512 in an R-DKC (Y).

In S610, the UI program 111 in the host computer 100 acquires a user command from a script 115 or an input unit 140 and issues the user command to the management program 112.

Afterward, in S620, the management program 112 specifies V-LDEV of the target LDEV belonging to the target pair designated by the user command, R-LDEV corresponding to the V-LDEV, and R-DKC (X) corresponding to the R-LDEV, based on the configuration definition file 116 and the host-side conversion information 117. Then, the management program 112 specifies a command device of the R-DKC (X) in S625. Afterward, in S630, the management program 112 sends the pair management command corresponding to the user command to the command device of the R-DKC (X).

Afterward, in S640, the control program 512 in the R-DKC (X) receives a pair management command from the host computer 100 and compares the arguments of the pair management command and the DKC-side conversion information (X). In this case, it is assumed that all of the V-DKC number, the R-DKC number, and the R-LDEV number in the arguments of the pair management command match with those in the DKC-side conversion information (X). In this case, in S660, the control program 512 performs a pair management process according to the pair management command. Afterward, in S670, the control program 512 sends, to the host computer 100, a response indicating the result of the pair management process.

Afterward, in S680, the management program 112 in the host computer 100 receives the response from the R-DKC (X) and passes the contents of the response to the UI program 111.

Afterward, in S690, the UI program 111 executes a process according to the result of the pair management process and ends this sequence.

According to the sequence, the pair management process of the R-LDEV corresponding to the V-LDEV designated by the user command can be caused to be executed by the corresponding R-DKC (X).

Figure 17:
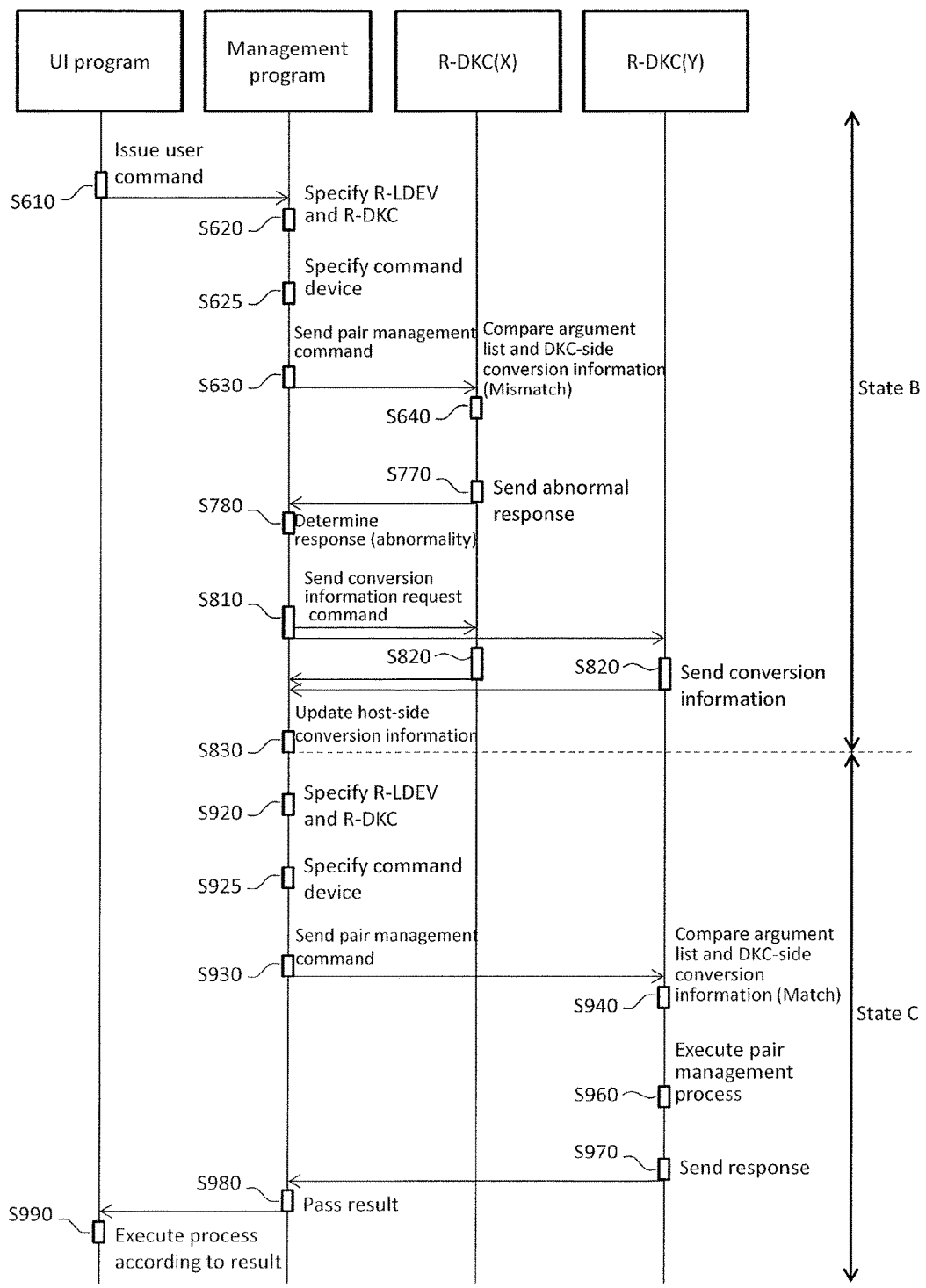
FIG. 17 depicts an operation of a computer system based on a storage instruction process in the state B of a virtualization configuration.

FIG. 17 depicts an operation of a computer system based on a storage instruction process in the state B of a virtualization configuration.

FIG. 17 depicts an operation sequence of a UI program 111 in a host computer 100, a management program 112 in the host computer 100, a control program 512 in an R-DKC (X), and a control program 512 in an R-DKC (Y).

S610 to S640 are the same as those in the state A. In the state B, a combination of the V-DKC number, the R-DKC number, and the R-LDEV number in arguments of the pair management command does not match with that in the DKC-side conversion information (X). In this case, in S770, the control program 512 sends, to the host computer 100, a response indicating that the result of the pair management process is abnormal.

Afterward, in S780, the management program 112 in the host computer 100 receives a response from the R-DKC (X) and determines the contents of the response. In the state B, the response indicated an abnormality in the host-side conversion information 117.

Afterward, in S810, the management program 112 specifies all of the command devices associated with the target LDEV of the pair management command on the basis of the configuration definition file 116 and sends, to the specified command devices, a conversion information request command designating the target LDEV. In this case, the management program 112 sends the conversion information request command to the command device of R-DKC (X) and the command device of R-DKC (Y).

Afterward, in S820, the control program 512 of each of the R-DKC (X) and the R-DKC (Y) sends, to the host computer 100, conversion information pertaining to the target LDEV in the DKC-side conversion information 517.

Afterward, in S830, the management program 112 in the host computer 100 receives conversion information from the R-DKC (X) and the R-DKC (Y) and merges the receives conversion information to update the host-side conversion information 117. Thus, the state of the computer system becomes the state C.

Afterward, in S920, the management program 112 specifies a V-LDEV of the target LDEV belonging to the target pair designated by the user command, an R-LDEV corresponding to the V-LDEV, and an R-DKC (Y) corresponding to the R-LDEV on the basis of the configuration definition file 116 and the host-side conversion information 117. Afterward, in S925, the management program 112 specifies a command device of the R-DKC (Y). Afterward, in S930, the management program 112 sends, to the command device of the R-DKC (Y), a pair management command corresponding to the user command.

Afterward, in S940, the control program 512 in the R-DKC (Y) receives the pair management command from the host computer 100. Afterward, in S950, the control program 512 compares arguments of the pair management command and the DKC-side conversion information (Y). In the state C, a combination of the V-DKC number, the R-DKC number, and the R-LDEV number in the arguments of the pair management command matches with that in the DKC-side conversion information (Y). In this case, in S960, the control program 512 performs a pair management process corresponding to the pair management command on the target R-LDEV. Afterward, in S970, the control program 512 sends, to the host computer 100, a response indicating that the result of the pair management process is normal.

Afterward, in S980, the management program 112 in the host computer 100 receives a response from the R-DKC (Y) and passes the contents of the response to the UI program 111.

Afterward, in S990, the UI program 111 executes a process corresponding to the result of the pair management process and ends this sequence.

According to the sequence, when the host-side conversion information 117 does not match with the DKC-side conversion information (X) and the DKC-side conversion information (Y) as in the state B, the host-side conversion information 117 can be caused to match with the DKC-side conversion information (X) and the DKC-side conversion information (Y) by acquiring conversion information from the R-DKC (X) and the R-DKC (Y) by the host computer 100. Accordingly, the host computer 100 can thereafter send the pair management command to the correct command device.

According to the present embodiment, the user of the host computer 100 can continue an access to the V-DKC (Z) and the V-LDEV without changing the script 115 and the configuration definition file 116 before and after the data migration. Thus, the user can perform data migration from the storage device (X) to the storage device (Y) without closing an application(s) executed by the host computer 100.

Embodiment 2

In the present embodiment, an example in which the host computer 100 regularly acquires the contents of DKC-side conversion information 517 from a storage system 300 is described. The configuration of the computer system in the present embodiment is the same as that in Embodiment 1.

Figure 18:
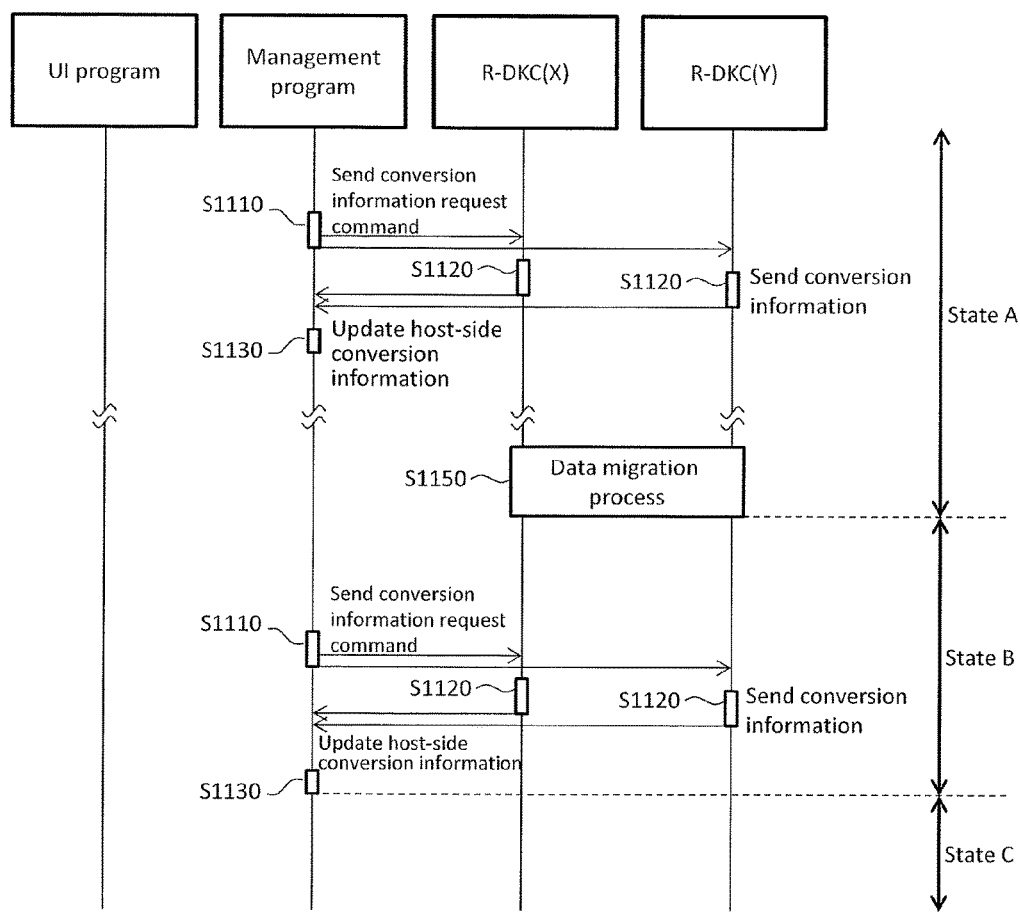
FIG. 18 depicts a polling process in Embodiment 2.

FIG. 18 depicts a polling process in Example 2.

FIG. 18 depicts an operation sequence of a UI program 111 in a host computer 100, a management program 112 in the host computer 100, a control program 512 in an R-DKC (X), and a control program 512 in an R-DKC (Y).

In S1110, the management program 112 in the host computer 100 specifies all of command devices indicated in a configuration definition file 116 and sends a conversion information request command to the specified command devices.

In S1120, the control program 512 in each of the R-DKC (X) and the R-DKC (Y) sends, to the host computer 100, conversion information pertaining to all of V-LDEVs in DKC-side conversion information 517.

In S1130, the management program 112 in the host computer 100 receives the conversion information from each of the R-DKC (X) and the R-DKC (Y) and merges the received conversion information to update the host-side conversion information 117.

The polling process is as described above. Afterward, the management program 112 executes this polling process every time the predetermined time elapses.

It is assumed that, in the state A, after the execution of the polling process, the R-DKC (X) and the R-DKC (Y) executes a data migration process from the R-DKC (X) to the R-DKC (Y) in S1150. Accordingly, the state of the computer system is transited to the state B. Afterward, when the polling process is executed, the state of the computer system is transited to the state C.

According to this polling process, the host computer 100 can regularly cause the host-side conversion information 117 to match with the DKC-side conversion information 517 even in the case where the host computer 100 does not receive the user command. Accordingly, when the host computer 100 sends the pair management command to the storage system 300, a case where a process delays by a mismatch between the host-side conversion information 117 and the DKC-side conversion information 517 can be reduced.

Embodiment 3

In the present embodiment, an example of acquiring the contents of DKC-side conversion information 517 from a storage system 300 by a host computer 100 according to a notice of completion of data migration from the storage system 300 to the host computer 100 is described. The configuration of the computer system in the present embodiments is the same as that in Embodiment 1.

Figure 19:
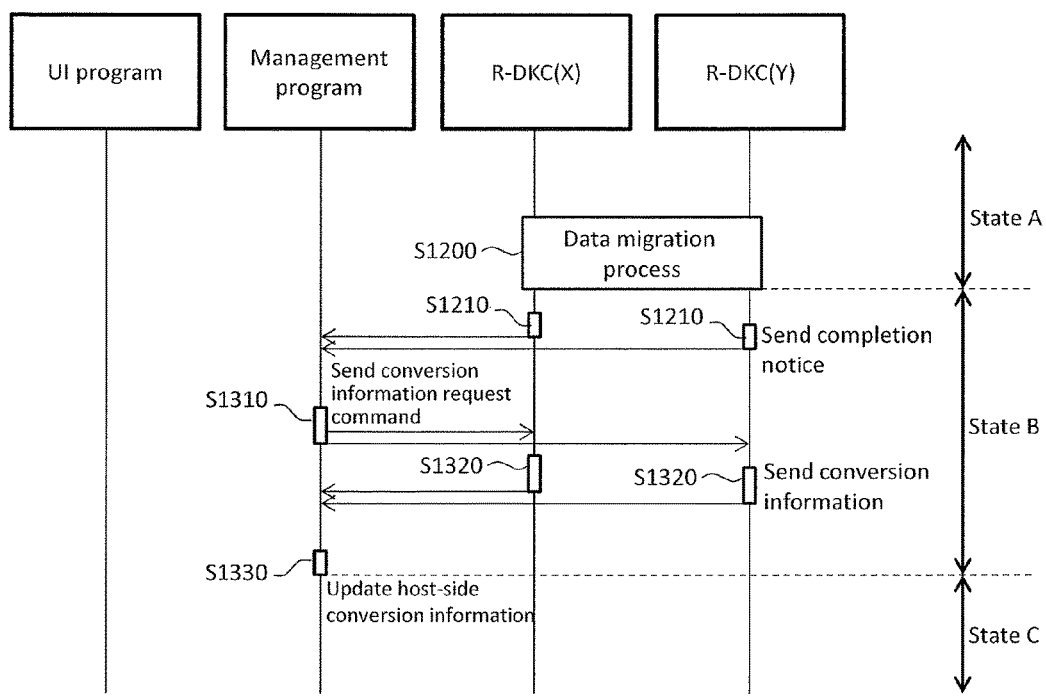
FIG. 19 depicts a data migration completion process in Embodiment 3.

FIG. 19 depicts a data migration completion process in Embodiment 3.

FIG. 19 depicts an operation sequence of a UI program 111 in a host computer 100, a management program 112 in the host computer 100, a control program 512 in an R-DKC (X), and a control program 512 in an R-DKC (Y).

In S1200 of the state A, an R-DKC (X) and an R-DKC (Y) execute a data migration process from the R-DKC (X) to the R-DKC (Y). Accordingly, the state of the computer system is transited to the state B. When the data migration is completed, in S1210, the control program 512 of each of the R-DKC (X) and the R-DKC (Y) sends, to the host computer 100, a completion notice indicating completion of the data migration of a target V-LDEV. The control program 512 of either the R-DKC (X) or the R-DKC (Y) may send the completion notice to the host computer 100.

In S1310, the management program 112 in the host computer 100 specifies all of command devices pertaining to the target V-LDEV and sends a conversion information request command designating the target V-LDEV to the specified command devices on the basis of the configuration definition file 116. The management program 112 sends the conversion information request command to each of the command device of the R-DKC (X) and the command device of the R-DKC (Y).

In S1320, the control program 512 of each of the R-DKC (X) and the R-DKC (Y) sends, to the host computer 100, the conversion information pertaining to the target V-LDEV in the DKC-side conversion information 517.

In S1330, the management program 112 in the host computer 100 receives the conversion information from each of the R-DKC (X) and the R-DKC (Y) and merges the received conversion information to update the host-side conversion information 117. Accordingly, the state of the computer system is transited to the state C.

The data migration completion process is as described above.

The completion notice may include the conversion information pertaining to the target V-LDEV in the DKC-side conversion information 517.

According to this data migration completion process, the host computer 100 can recognize a change in DKC conversion information 517 by receiving the completion notice. Accordingly, the host computer 100 can regularly cause the host-side conversion information 117 to match with the DKC-side conversion information 517 even in the case where the host computer 100 does not receive the user command. Accordingly, the time in which the host-side conversion information 117 does not match with the DKC-side conversion information 517 can be reduced.

The computer system may be a combination of any of the above-mentioned plurality of embodiments.

The terms for expression of the present invention are described below. The storage system corresponds to the storage system 300 or the like. The host computer corresponds to the host computer 100 or the like. The first controller corresponds to the R-DKC (X) that is the DKC 500 or the like. The second controller corresponds to the R-DKC (Y) that is the DKC 500. The first storage device corresponds to the disc 900 in the storage device (X) or the like. The second storage device corresponds to the disc 900 in the storage device (Y) or the like. The first logical storage area corresponds to a pair of R-LDVE #0x2000 and #0x2001 or the like. The second logical storage area corresponds to a pair of R-LDEV #0x5000 and #0x5001 or the like. The specific virtual storage area corresponds to a pair of V-LDEV #0x1000 and #0x1001 or the like. The first association information corresponds to the DKC-side conversion information (X) that is the DKC-side conversion information 517 or the like. The second association information corresponds to the DKC-side conversion information (Y) that is the DKC-side conversion information 517 or the like. The management command corresponds to the storage management command, the pair management command, or the like. The conversion information corresponds to the host-side conversion information 117 or the like.

The present invention is not limited to the above-described embodiments, and various changes in form may be made therein without departing from the spirit and scope of the present invention.

REFERENCE SIGNS LIST

100 Host computer
110 Memory
111 UI program
112 Management program
115 Script
116 Configuration definition file
117 Host-side conversion information
120 CPU
130 HBA
140 Input unit
150 Output unit
300 Storage system
400 Storage device
500 DKC
510 Memory
511 Control program
517 DKC-side conversion information
520 MP
530 CHA
540 DKA
900 Disc

The invention claimed is:

1. A storage system comprising:
a first storage device;
a first controller coupled to a host computer and the first storage device;
a second storage device; and
a second controller coupled to the host computer, the second storage device, and the first controller, wherein
the first controller controls a first logical storage area based on the first storage device, allocates the first logical storage area to a specific virtual storage area that is a virtual storage area, stores first association information indicating the specific virtual storage area and the first logical storage area, and sends the first association information to the host computer,
the second controller controls a second logical storage area based on the second storage device,
the first controller and the second controller performs data migration from the first logical storage area to the second logical storage area,
the first controller releases the first logical storage area from the specific virtual storage area and reflects the release in the first association information,
the second controller allocates the second logical storage area to the specific virtual storage area, stores second association information indicating the specific virtual storage area and the second logical storage area, and sends the second association information to the host computer,
the first controller receives a management command, the first controller determines whether or not a combination of the specific virtual storage area and a specific logical storage area indicated in the management command is included in the first association information, and
when it is determined that the combination is not included in the first association information, the first controller sends, to the host computer, an abnormal response indicating that the combination is an error.

2. The storage system according to claim 1, wherein
the host computer specifies, based on the first association information and the second association information, the specific logical storage area that is a logical storage area allocated to the specific virtual storage area and a specific controller that is a controller that controls the specific logical storage area, and sends the management command indicating the specific virtual storage area and the specific logical storage area to the specific controller.

3. The storage system according to claim 2, wherein
when it is determined that the combination is included in the first association information, the first controller performs a process corresponding to the management command on the logical storage area indicated in the management command.

4. The storage system according to claim 3, wherein
when the first controller receives, from the host computer, a request command for requesting information indicating association between the virtual storage area and the logical storage area, the first controller sends the first association information to the host computer, and
when the second controller receives the request command from the host computer, the second controller sends the second association information to the host computer.

5. The storage system according to claim 4, wherein
the specific virtual storage area is a pair of virtual volumes, and each of the first logical storage area and the second logical storage area is a pair of logical volumes, and
the management command is a command indicating management of the pair of virtual volumes.

6. The storage system according to claim 5, wherein
the first association information indicates the specific virtual storage area, the first logical storage area, and a virtual controller associated with the specific virtual storage area, and
the combination indicates a combination of the specific virtual storage area, the specific logical storage area, and the virtual controller.

7. The storage system according to claim 4, wherein
the request command is sent from the host computer to the first controller and the second controller in response to the abnormal response.

8. The storage system according to claim 4, wherein
upon completion of the data migration, one of the first controller and the second controller sends, to the host computer, a completion notice indicating the completion of the data migration.

9. The storage system according to claim 8, wherein
in response to the completion notice, the request command is sent from the host computer to the first controller and the second controller.

10. The storage system according to claim 4, wherein
the request command is periodically sent from the host computer to the first controller and the second controller.

11. A computer system comprising:
a host computer;
a first storage device;
a first controller coupled to the host computer and the first storage device;
a second storage device; and
a second controller coupled to the host computer, the second storage device, and the first controller, wherein
the first controller controls a first logical storage area based on the first storage device, allocates the first logical storage area to a specific virtual storage area that is a virtual storage area, stores first association information indicating the specific virtual storage area and the first logical storage area, and sends the first association information to the host computer,
the second controller controls a second logical storage area based on the second storage device,
the first controller and the second controller performs data migration from the first logical storage area to the second logical storage area,
the first controller releases the first logical storage area from the specific virtual storage area and reflects the release in the first association information, the second controller allocates the second logical storage area to the specific virtual storage area, stores second association information indicating the specific virtual storage area and the second logical storage area, and sends the second association information to the host computer,
the host computer receives the first association information and the second association information, stores host-side conversion information based on the first association information and the second association information, specifies the specific virtual storage area, a specific logical storage area that is a logical storage area allocated to the specific virtual storage area, and a specific controller that is a controller that controls the specific logical storage area on the basis of the host-side conversion information, and sends a management command indicating the specific virtual storage area and the specific logical storage area to the specific controller,
the first controller receives the management command and determines whether or not a combination of the specific virtual storage area and the specific logical storage area indicated in the management command is included in the first association information, and
the first controller sends, to the host computer, an abnormal response indicating that the combination is an error when it is determined that the combination is not included in the first association information.

12. A method for controlling storage, comprising:
using a first controller to control a first logical storage area based on a first storage device, to allocate the first logical storage area to a specific virtual storage area that is a virtual storage area, store first association information indicating the specific virtual storage area and the first logical storage area, and to send the first association information to a host computer,
using a second controller to control a second logical storage area based on a second storage device,
using the first controller and the second controller to perform data migration from the first logical storage area to the second logical storage area,
using the first controller to release the first logical storage area from the specific virtual storage area and to reflect the release in the first association information,
using the second controller to allocate the second logical storage area to the specific virtual storage area, to store second association information indicating the specific virtual storage area and the second logical storage area, and to send the second association information to the host computer,
using the host computer to receive the first association information and the second association information, to store host-side conversion information based on the first association information and the second association information, to specify the specific virtual storage area, a specific logical storage area that is a logical storage area allocated to the specific virtual storage area, and a specific controller that is a controller that controls the specific logical storage area on the basis of the host-side conversion information, and to send a management command indicating the specific virtual storage area and the specific logical storage area to the specific controller,
using the first controller to determine whether or not a combination of the specific virtual storage area and the specific logical storage area indicated in the management command is included in the first association information when the first controller to receive the management command, and using the first controller to send, to the host computer, an abnormal response indicating that the combination is an error when it is determined that the combination is not included in the first association information.

* * * * *